(12) United States Patent
Tremblay et al.

(10) Patent No.: US 12,088,213 B2
(45) Date of Patent: Sep. 10, 2024

(54) POWER SUPPLY UNIT FOR VEHICLE CHARGING

(71) Applicants: Marco Tremblay, Pierrefonds (CA); Sheila Tremblay, Pierrefonds (CA)

(72) Inventors: Marco Tremblay, Pierrefonds (CA); Sheila Tremblay, Pierrefonds (CA)

(73) Assignee: HI-POWER SOLUTIONS INC., Pierrefonds (CA)

( * ) Notice: Subject to any disclaimer, the term of this patent is extended or adjusted under 35 U.S.C. 154(b) by 0 days.

(21) Appl. No.: 17/747,565

(22) Filed: May 18, 2022

(65) Prior Publication Data
US 2022/0376631 A1 Nov. 24, 2022

Related U.S. Application Data

(60) Provisional application No. 63/190,369, filed on May 19, 2021.

(51) Int. Cl.
*H02M 3/158* (2006.01)
*H02M 7/06* (2006.01)
(Continued)

(52) U.S. Cl.
CPC ....... *H02M 7/2176* (2013.01); *H02M 3/1586* (2021.05); *H02M 7/06* (2013.01); *B60L 53/67* (2019.02); *H02J 7/02* (2013.01)

(58) Field of Classification Search
CPC .... H02M 7/2176; H02M 3/1586; H02M 7/06; H02M 1/4225; H02M 7/10;
(Continued)

(56) References Cited

U.S. PATENT DOCUMENTS

| 3,308,368 A | 3/1967 | Schmidt, Jr. |
| 4,498,127 A | 2/1985 | Fiorina |

(Continued)

FOREIGN PATENT DOCUMENTS

| CA | 3052825 | 2/2020 |
| DE | 102016102053 | 8/2017 |

(Continued)

OTHER PUBLICATIONS

Ghanem M.C., K., et al. "A new single phase buck-boost converter with unity power factor", Conference Record of the 1993 IEEE Industry Applications Conference Twenty-Eighth IAS Annual Meeting, 1993.

*Primary Examiner* — Elim Ortiz
(74) *Attorney, Agent, or Firm* — NORTON ROSE FULBRIGHT CANADA LLP

(57) ABSTRACT

There is described a power supply unit having at least one alternating current (AC) input and at least one direct current (DC) output for producing an output voltage. The power supply unit comprises at least one input transformer coupled to the at least one AC input and at least one rectification circuit defining an AC side and a DC side, and coupled to the at least one input transformer on the AC side. The at least one rectification circuit comprises a diode rectifier section on the AC side comprising at least one set of diode rectifiers, and a controlled rectifier section in series with the diode rectifier section and configured for producing a variable load voltage to modulate the output voltage between a base voltage and a maximum value of the output voltage using at least one set of three single-phase controlled rectifiers usable as one to three DC outputs to form a three-phase controlled rectifier.

18 Claims, 21 Drawing Sheets

(51) Int. Cl.
*H02M 7/217* (2006.01)
*B60L 53/67* (2019.01)
*H02J 7/02* (2016.01)

(58) Field of Classification Search
CPC ............ H02M 1/4283; H02M 3/1582; H02M 1/0077; B60L 53/67; B60L 53/22; B60L 2210/10; B60L 2210/30; H02J 7/02; H02J 1/082; H02J 7/04; H02J 7/35; Y02T 10/7072; E04B 2/08; E04B 2002/0206; E04B 2002/0243; E04B 2002/025; E04B 2002/0256

See application file for complete search history.

(56) References Cited

U.S. PATENT DOCUMENTS

| | | | |
|---|---|---|---|
| 4,940,929 | A | 7/1990 | Williams |
| 5,006,975 | A | 4/1991 | Neufeld |
| 5,602,463 | A | 2/1997 | Bendall et al. |
| 5,638,263 | A | 6/1997 | Opal et al. |
| 5,781,428 | A | 7/1998 | Paice |
| 6,531,854 | B2 | 3/2003 | Hwang |
| 7,135,836 | B2 | 11/2006 | Kutkut et al. |
| 7,812,576 | B2 | 10/2010 | Sutardja et al. |
| 8,810,198 | B2 | 8/2014 | Nergaard et al. |
| 8,829,851 | B2 | 9/2014 | Prosser et al. |
| 8,890,473 | B2 | 11/2014 | Muller et al. |
| 9,236,755 | B2 | 1/2016 | Chang |
| 9,571,022 | B2 | 2/2017 | Pan et al. |
| 9,575,533 | B2 | 2/2017 | Watkins et al. |
| 9,973,028 | B2 | 5/2018 | Namuduri et al. |
| 2005/0276082 | A1* | 12/2005 | Panda .................. H02M 7/219 363/70 |
| 2013/0271077 | A1* | 10/2013 | Kim ........................ B60L 53/22 320/109 |
| 2017/0225580 | A1* | 8/2017 | Oestreicher ............... H02J 3/46 |
| 2020/0039375 | A1 | 2/2020 | Vankata et al. |

FOREIGN PATENT DOCUMENTS

| | | |
|---|---|---|
| DE | 102017128092 | 2/2019 |
| DE | 102017130474 | 6/2019 |
| DE | 102018117157 | 1/2020 |
| EP | 0080925 | 6/1983 |
| EP | 1759450 | 1/2014 |
| JP | 4954335 | 6/2012 |
| JP | 6247382 | 12/2017 |
| WO | 2001001552 | 1/2001 |

* cited by examiner

POWER SUPPLY UNIT FOR VEHICLE CHARGING

CROSS-REFERENCE TO RELATED APPLICATIONS

The present application claims priority under 35 USC 119(e) of U.S. Provisional Patent Application No. 63/190,369, filed on May 19, 2021, the contents of which are hereby incorporated by reference.

TECHNICAL FIELD

The present disclosure relates generally to large electrical power supply units and, more specifically, to power supply units that may act as chargers for electric vehicles with an interface to renewable energy sources.

BACKGROUND OF THE ART

As vehicle electrification expands towards heavier duty vehicles, the implications of their very high charging power requirements must be addressed. Alternating current (AC) to direct current (DC) charger technology is difficult to scale up to powers in the megawatt (MW) range. New charger technology is needed for high power applications. Another issue is the large variations in power demand imposed on the electrical grid when vehicles are added or removed from the charger.

In a complementary field, some of the difficulties facing renewable energy infrastructures are the high cost of the components and the difficulty in regulating energy production. A typical example is the need for energy storage associated with wind or solar energy production. The storage system used by others represents a large part of the installed cost but is only used intermittently.

Therefore, improvements are desired.

SUMMARY

In one aspect, there is provided a power supply unit having at least one alternating current (AC) input and at least one direct current (DC) output for producing an output voltage. The power supply unit comprises at least one input transformer coupled to the at least one AC input and at least one rectification circuit defining an AC side and a DC side, and coupled to the at least one input transformer on the AC side. The at least one rectification circuit comprises a diode rectifier section on the AC side comprising at least one set of diode rectifiers, and a controlled rectifier section in series with the diode rectifier section and configured for producing a variable load voltage to modulate the output voltage between a base voltage and a maximum value of the output voltage using at least one set of three single-phase controlled rectifiers usable as one to three DC outputs to form a three-phase controlled-rectifier.

In some embodiments, the diode rectifier section is configured for providing the base voltage from the at least one set of diode rectifiers.

In some embodiments, the power supply unit further comprises a switching array coupled to the diode rectifier section and the controlled rectifier section, and configured for selectively providing the output voltage to loads connected at the at least one DC output.

In some embodiments, the switching array is further configured for switching in other DC sources to replace or supplement the diode rectifier section.

In some embodiments, the power supply unit further comprises a switching array coupled to the diode rectifier section and the controlled rectifier section, and configured for selecting an AC source for at least some of the diode rectifiers and the controlled rectifiers.

In some embodiments, the at least one set of diode rectifiers comprises single-phase rectifiers for each galvanically isolated secondary winding of the at least one input transformer.

In some embodiments, the at least one set of diode rectifiers comprises at least one three-phase diode rectifier.

In some embodiments, the at least one set of diode rectifiers comprises a plurality of sets, each one of the sets providing a fixed voltage step of the base voltage.

In some embodiments, the power supply unit further comprises a plurality of switches connected between the at least one input transformer and the diode rectifier section for selectively activating and deactivating individual ones of the sets of diode rectifiers.

In some embodiments, each of the single-phase controlled rectifiers comprise a buck-boost converter.

In some embodiments, the single-phase controlled rectifiers comprise a four-diode bridge having an output that feeds a buck converter of the buck-boost converter, and the buck converter shares an inductor with a boost converter of the buck-boost converter.

In some embodiments, the single-phase controlled rectifiers comprise interleaved buck-boost converters connected in parallel.

In some embodiments, the controlled rectifier section comprises a plurality of single-phase controlled rectifiers per phase, and, for each phase, the diode rectifiers are connected in series with the plurality of single-phase controlled rectifiers.

In some embodiments, each of the single-phase controlled rectifiers comprises a boost converter.

In some embodiments, the single-phase controlled rectifiers comprise a four-diode bridge having an output that feeds the boost converter.

In some embodiments, the single-phase controlled rectifiers comprise interleaved boost converters connected in parallel.

In some embodiments, the single-phase controlled rectifiers impose a current waveform onto the series connected diode rectifiers.

In some embodiments, the switching array comprises a plurality of switches connected between the diode rectifier section and the controlled rectifier section and the DC sources and loads for dynamically forming sub-groups of rectifiers.

In some embodiments, the switching array is configured for switching in one of a DC source and a storage device to replace or supplement some or all of the diode rectifiers.

In some embodiments, some or all of the diode rectifiers and the controlled rectifiers supply current to one of an energy storage device, an electrolyzer, and one or more internal loads.

In some embodiments, some of the switches of the switching array are configured to multiplex some outputs of the controlled rectifiers between multiple vehicles in a programmed sequence.

The embodiments described herein may be used in any combination.

DESCRIPTION OF THE DRAWINGS

Reference is now made to the accompanying figures in which.

It will be noticed that throughout the appended drawings, like features are identified by like reference numerals.

DETAILED DESCRIPTION

To address the issues with existing systems, there is proposed herein a power converter using a multi-level rectifier and the associated switching array, which adapts dynamically to a varying mix of power conversion needs. More specifically, a multi-level power converter is used mostly in rectifier mode, with the switching array that dispatches its resources to multiple functions. In one embodiment, the proposed combination of the power converter with the switching array may allow for the configuration of a charger (e.g., for electric vehicles) to be dynamically changed to provide different services and reuse available resources. In one embodiment, the proposed power converter circuit may present advantages in energy efficiency and cost reduction. When combined with renewable energy sources and storage functions, the proposed power converter circuit may facilitate the sharing of power converters, eliminating the need for supplementary power conversion equipment for each function. As will be discussed further below, the proposed system uses isolated sections to produce a new functionality when combined with the switching array. The proposed converters may then be used in various combinations and may advantageously allow for charging internal or external loads (e.g., batteries), powering electrolyzers, use in solar cells, amongst other applications. In some embodiments, the proposed system may also allow the rectifiers to be series connected in steps to reduce cost.

In addition, in some embodiments, the use of buck-boost and boost converters may allow for the reduction of harmonics in the controlled rectifiers and may force the sinusoidal current in the diodes rectifiers that would otherwise produce a significant level of harmonics.

Figure 1:
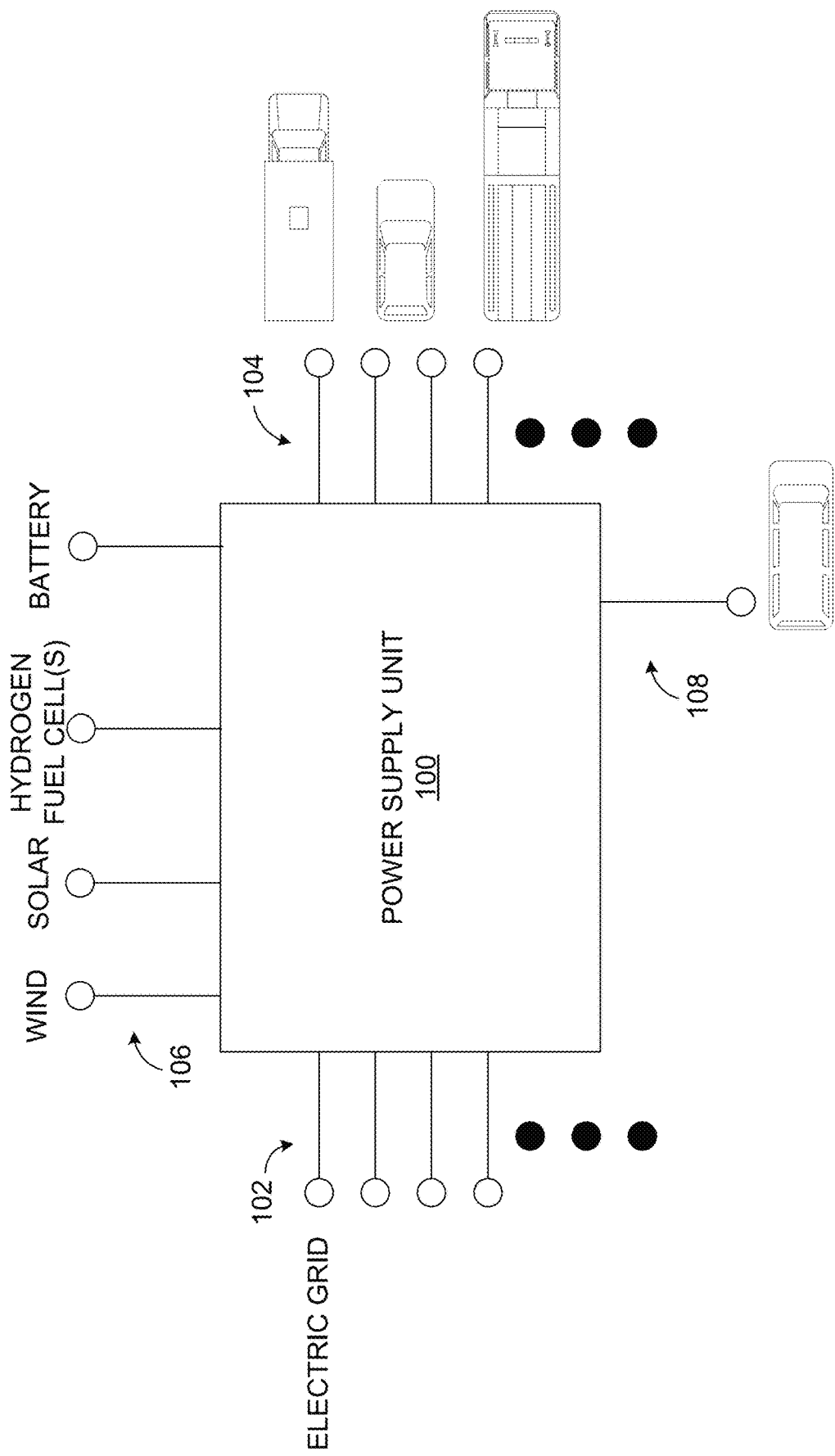
FIG. 1 is a simplified high-level diagram of an example charging system using a power supply unit (PSU)

FIG. 1 illustrates an example of a power supply unit (PSU) 100 having at least one alternating current (AC) input 102 and at least one direct current (DC) output 104 which may be used as a clean energy, fast charging/fueling system for light to heavy-duty vehicles. In some embodiments, the PSU 100 is optimized for high power applications in the 10 kW to 10 MW range. One or more alternative energy inlets 106 may be provided for local renewable energy production using wind generation or photoelectric solar panels, or for stored energy from batteries or hydrogen fuel cells. One or more hydrogen outlets 108 may be provided for refueling of hydrogen vehicles or sale into a distribution network. The PSU 100 may be used, for example, by a vehicle fleet operator managing battery electric vehicles (BEV) and hydrogen electric vehicles (HEV) of different sizes. The synergies between various clean energy technologies may be leveraged to reduce the overall cost of ownership for fleet operators. The system may be applicable to various types of vehicles used on roads, sea, air, and rail, as well as off-road equipment used for farming, construction, or mining operations.

In some embodiments, the PSU 100 dispatches electricity between various types of equipment depending on need, to provide energy in various forms. The PSU 100 may operate according to the lowest cost at the time of need and can combine multiple sources (into sub-groups) dynamically. For large fleets, one of the limiting factors in vehicle electrification is the peak power demand from the electric grid. The PSU 100 can address this by accommodating different means of energy storage without the need for supplementary power converters as is usually the case. Examples of energy storage technologies include battery accumulators (cells or flow batteries), super capacitors, reversible hydrogen fuel cells, inertial (fly wheel) accumulators, and any other suitable storage technologies.

The components of the PSU 100 may be arranged in independent modules that can perform various tasks concurrently, such as, but not limited to, charging one or many vehicles of different sizes, charging an internal energy storage system when a surplus of renewable energy is available or the cost of electricity from the grid is advantageous, using energy from a storage system, powering an electrolyzer to transform water into green hydrogen and oxygen or powering an electric waste treatment plasma torch. The efficiency of different equipment may be improved by using waste heat to produce one or more of demineralized water for green hydrogen production, pre-drying of biomass for electric plasma torch assisted syngas production, building heating, potable water from sea water using desalination by evaporation, or hot water for a car washing station or for domestic use. As such, various resources are pooled together to take advantage of various needs. This pooling of resources reduces the cost compared to having the equivalent systems built with completely independent equipment. This is facilitated by the specific electric circuits of the PSU 100 and its cooling system. Furthermore, a grid connection, its protection, and an inlet transformer may be shared by different components in the PSU 100. A charger's energy storage may be shared with renewable energy sources. A cooling system may be shared between different components. A fuel cell hydrogen compressor may be shared with a syngas production system.

Hydrogen gas expansion cooling can be used to cool down the power electronics. Telecom infrastructure and equipment monitoring may also be shared. The PSU 100 may also be used as a dedicated power supply. Possible applications for the PSU 100 and its controls may further include, but are not limited to, high-voltage, direct current (HVDC) rectification for electrical energy transport, DC microgrids rectification/control (e.g., for small communities, campuses, and the like), wind generation rectification with maximum power point tracking (MPPT) control, electrostatic precipitators DC power supply, DC arc furnace power supply for metal processing, and industrial DC link applications for shared DC bus motor drives.

In some embodiments, a large PSU 100 operates above 50 kW on a three-phase supply where at least three controlled rectifiers and one three-phase diode rectifier, or three single-phase diode rectifiers are used. In another embodiment, a smaller PSU 100 below 50 kW operates on a single-phase supply where at least one controlled rectifier and diode rectifier are used. In all embodiments, the PSU 100 can draw from the grid a high quality current having a unity power factor, high efficiency, and low harmonic distortion.

Figure 2A:
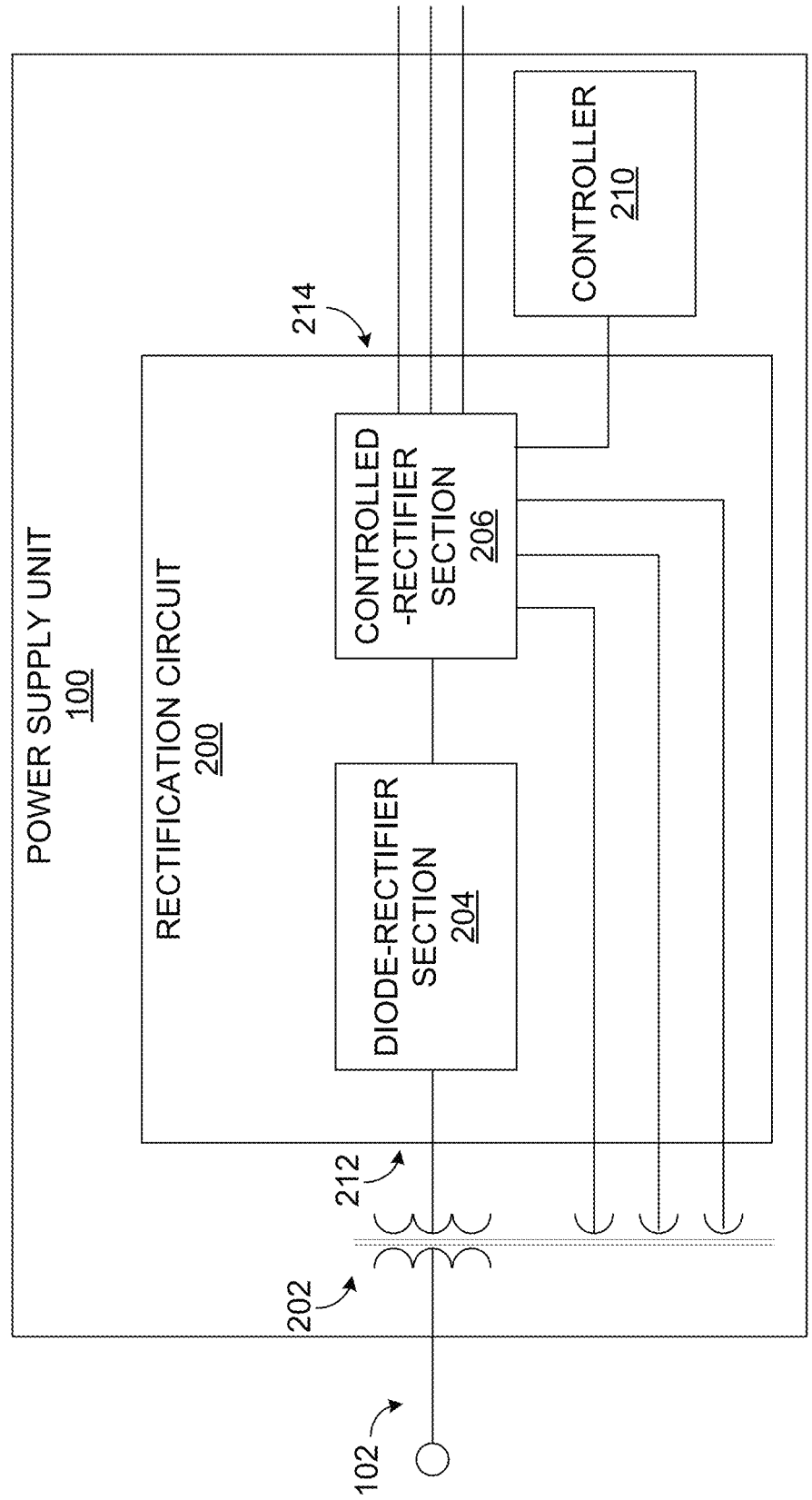
FIGS. 2A-2C are block diagrams of example embodiments of the PSU.

With reference to FIG. 2A, there is illustrated an example embodiment of the PSU 100 for producing an output voltage. An input transformer 202 is coupled to the AC input(s) 102 of the PSU 100. The input transformer 202 is coupled to a rectification circuit 200 defining an AC side 212 and a DC side 214. Although a single rectification circuit 200 is illustrated and described herein, it should be understood that, in some embodiments, multiple rectification circuits as in 200 may apply, for instance when multiple transformers as in 202 are used. In one embodiment, the rectification circuit 200 has a diode rectifier section 204 on the AC side 212 that provides a base voltage. A controlled rectifier section 206 is connected in series with the diode rectifier section 204 and configured for producing a variable voltage to modulate the output of the PSU 100 between the base voltage and a maximum value of the output voltage, as controlled by a controller 210. Although illustrated as part of the PSU 100, the controller 210 may, in some embodiments, be provided separately therefrom. In some embodiments, at low voltage, all diode rectifiers may be disabled and only the controlled rectifiers may produce an output voltage. In this case, the diode rectifiers may be initially disabled and may be brought into operation as voltage is increased.

It should be noted that the per phase configuration (i.e. the configuration in which the controlled rectifier section comprises a plurality of single-phase controlled rectifiers per phase, and where, for each phase, the diode rectifiers are connected in series with the controlled rectifier) may, in some embodiments, cause the diode rectifiers to conduct the same current waveform forced by the controlled rectifier. In other words, the controlled rectifier imposes the current waveform onto the diode rectifiers when connected in series. This may in turn improve power quality even when using diode rectifiers which would otherwise produce current distortion.

As most loads are usually operated in their upper voltage range, the PSU 100 uses affordable diode bridges in the diode rectifier section 204 to efficiently supply most of the load voltage through the base voltage. A relatively small, controlled rectifier section 206 is added to provide the final adjustment to the load voltage. This is more efficient and more economical than supplying all the power from a larger controlled rectifier. In some embodiments, the base voltage corresponds to between 25% and 75% of the total output voltage, and the controlled rectifier section 206 produces a variable load voltage required to modulate the output voltage to 100%. The two sections 204, 206 are combined to obtain an electrical DC source controlling the load voltage between its base value and 100%. The controlled rectifier section 206 may also be used to control the load current, in a way which mitigates some of the detrimental harmonics produced in large quantities by a multi-phase version of the diode rectifier section 204. The PSU 100 may be designed with various control ranges to accommodate specific load requirements by adjusting the relative size of the rectifiers or through the addition of other independent rectifiers, as will be described in more detail below.

Figure 2B:
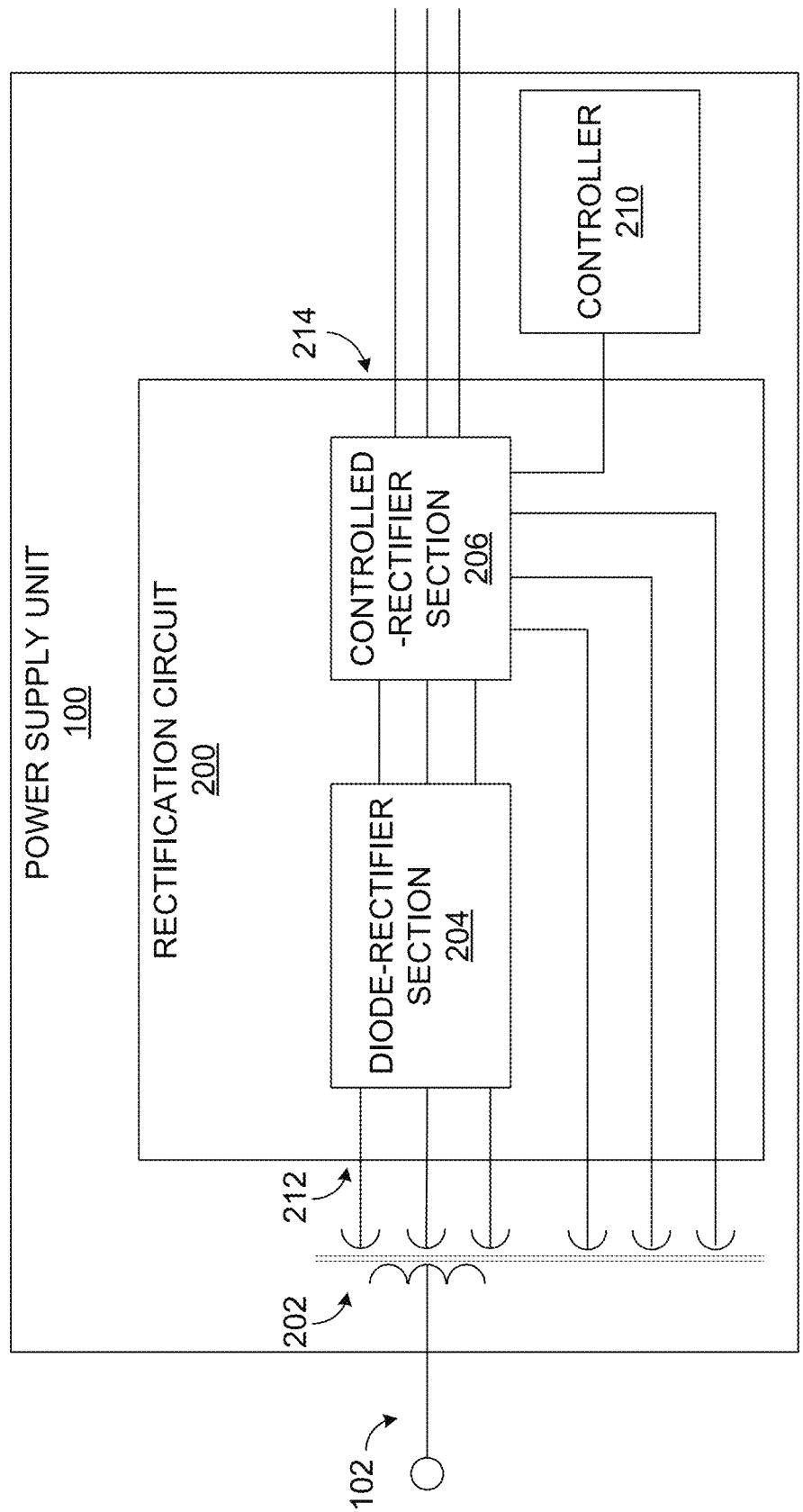
Figure 2C:
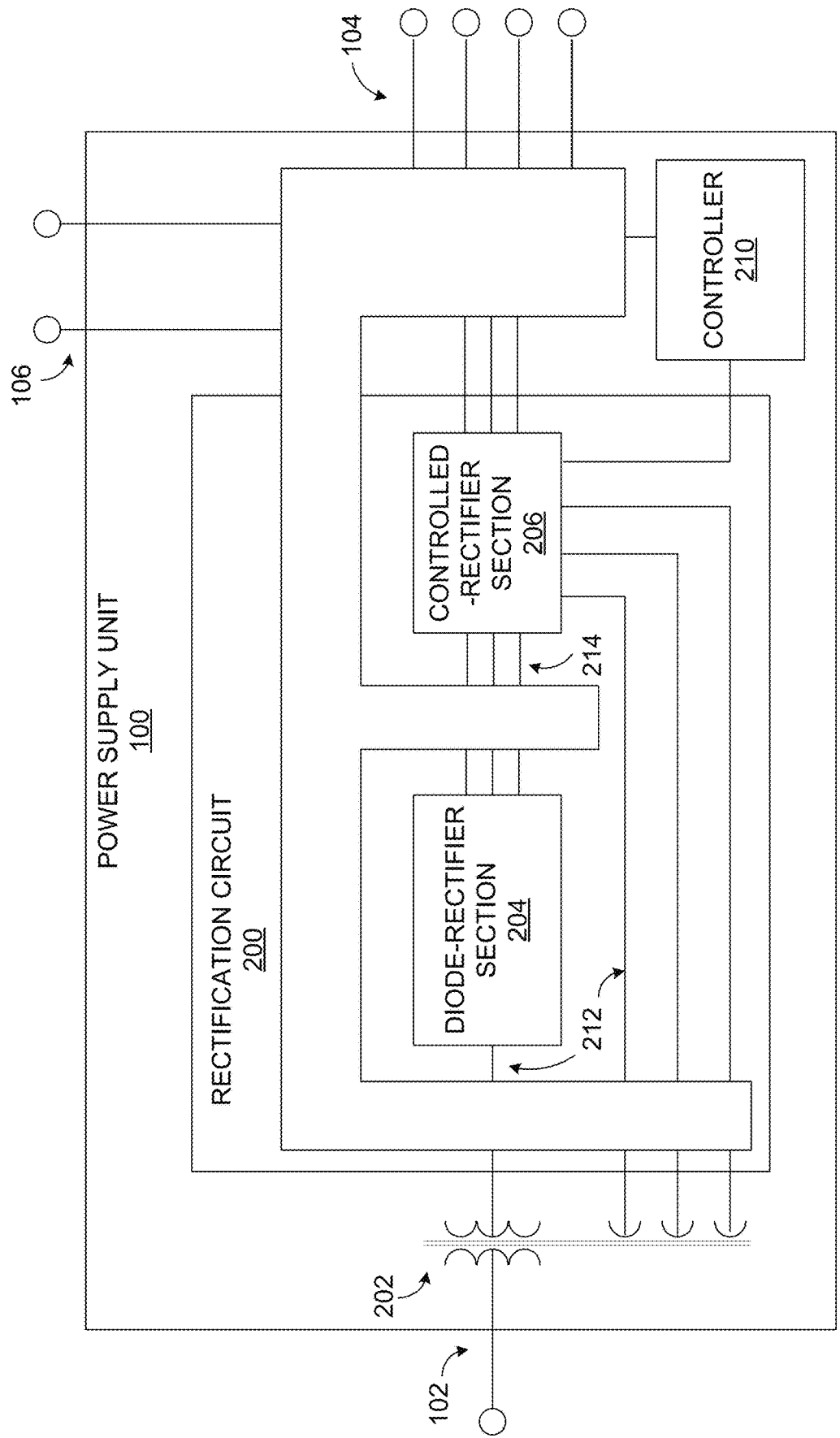

In the embodiment illustrated in FIG. 2A, the controlled rectifier section 206 uses galvanically isolated secondary windings of the transformer 202 to feed single-phase controlled rectifiers, which can be interconnected as one to three independent DC outputs, to perform three-phase controlled rectification. The diode rectifier section 204 comprises at least one three-phase diode rectifier. This is referred to herein as the three-phase embodiment. Another embodiment is illustrated in FIG. 2B, where the diode rectifier section 204 instead uses single-phase diode rectifiers to independently rectify each galvanically isolated secondary winding of the transformer 202. This is referred to herein as the per-phase embodiment. FIG. 2C illustrates yet another embodiment of the PSU 100, where a switching array 208 is coupled between the rectification circuit 200 and the DC outputs 104. It will be understood that the switching array 208 may also be added to the embodiment of FIG. 2B. The switching array 208 may be used to selectively send the rectified DC voltage and/or any source of renewable energy connected to the alternative energy inlets 106 as a base voltage to any one of the controller rectifiers (i.e. to the controlled rectifier section 206). The switching array 208 may be used as an energy dispatching center where the energy sources are combined with energy storage to deliver electricity to multiple vehicles and/or to produce green hydrogen through electrolysis. In some embodiments, the switching array 208 comprises of electro-mechanical switches. In other embodiments, the switching array 208 comprises semiconductor switches. In yet other embodiments, the switching array 208 may comprise a mix of electro-mechanical and semiconductor switches. Other embodiments may apply and it should be understood that any suitable switch may be used in the switching array 208.

Figure 3A:
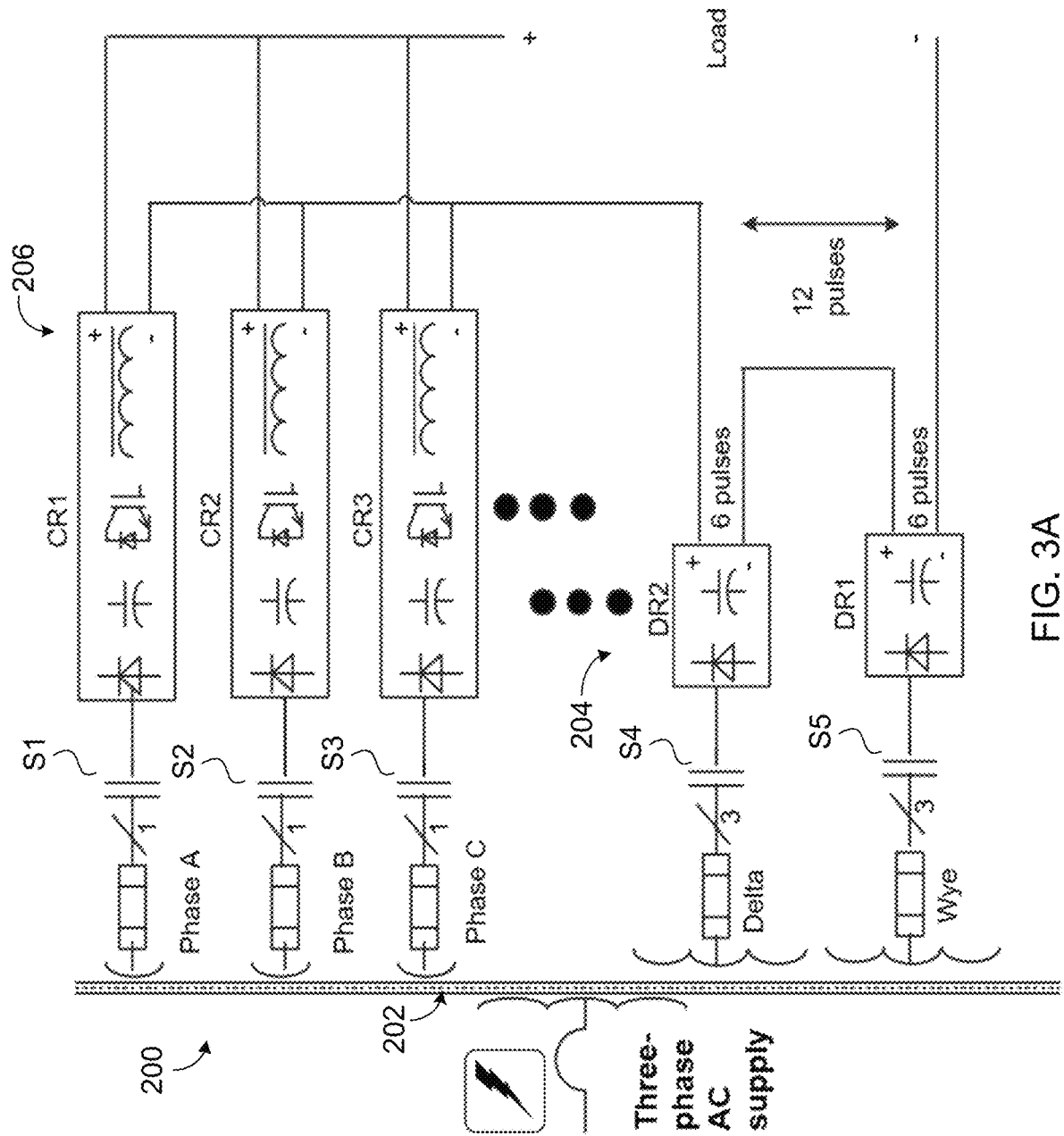
FIGS. 3A-3B are simplified electrical diagrams of example rectification circuits of the PSU.

FIG. 3A is an example embodiment of the rectification circuit 200 using three-phase rectifiers for the diode rectifier section 204, as per the embodiment of FIG. 2A. In this example, a plurality of three-phase diode rectifiers DR1, DR2 . . . , are coupled to the transformer 202 and connected in series with a plurality of controlled rectifiers CR1, CR2, CR3, . . . . This results in the DC current of the diode rectifiers DR1, DR2 being driven by the actions of the controlled rectifiers CR1, CR2, CR3. The diode rectifiers DR1, DR2 . . . , may form a 6, 12, or 18 pulse diode rectifier when connected to properly phase shifted transformer secondaries.

The controlled rectifiers CR1, CR2, CR3 are used to impose the DC current amplitude and control the waveform. This reduces the harmonics produced by the diode rectifiers DR1, DR2 alone. Also, the sinusoidal current drawn by the controlled rectifiers CR1, CR2, CR3 is added to the distorted AC current from the diode rectifiers DR1, DR2 at the transformer's primary. This reduces the harmonic distortion seen at the AC line even further. In the three-phase diode rectifier embodiment, further reduction in AC line harmonics can be obtained by modulating the controlled rectifier current with a small DC current ripple. This harmonic mitigating current is a medium frequency current ripple (6 to fifty times the line frequency). It is generated with an opposing phase to the AC current distortion produced by the diode rectifiers DR1, DR2 to produce active harmonic filtering. This small DC current ripple can then be filtered out on the DC output to avoid affecting the load. Two methods can be used to produce the small DC current ripple. The first method involves modulation of the controlled rectifier current reference with the anti-harmonics signal. The effectiveness of this technique can be limited by the narrow bandwidth of the current controller. The second method involves pulse skipping piloted by a fast controller to block or force the transistor switching independently from the slower current controller. This technique is particularly effective with an interleaved topology operating at higher effective switching frequency which offers more occasions to skip or impose pulses. FIG. 3A illustrates transistors of the type IGBT (Insulated Gate Bipolar Transistors) but any other suitable fast switching semiconductor, such as MOS-FET (Metal Oxide Semiconductor Field Effect Transistor, using silicon or silicon carbide or gallium nitride) or IGCT (Insulated Gate Commutated Thyristor), can be used. The transistors may be used as single components or in series or parallel combinations in order to reach the voltage and current needed.

Figure 4A:
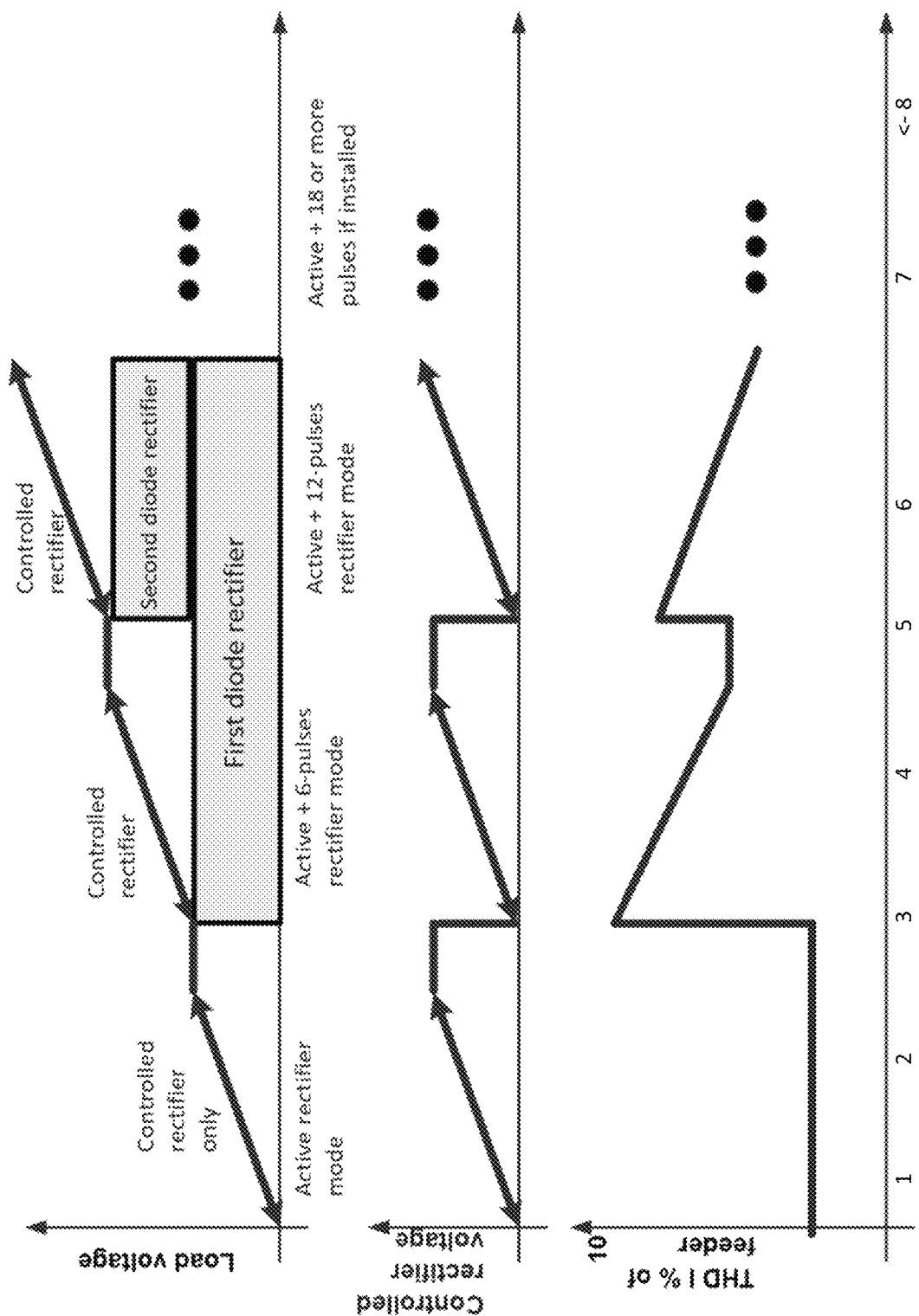
FIGS. 4A-4B are graphs illustrating example voltage control schemes of the PSU.

Step switching of the diode rectifiers DR1, DR2 and the additive voltage afforded by the series connection between the diode rectifiers DR1, DR2, and the controlled rectifiers CR1, CR2, CR3 allows the DC voltage of the PSU 100 to be controlled between a base value and 100% of its rated capacity. This is done by sequentially enabling the diode rectifiers DR1, DR2 in a step-like manner as needed and compensating the resulting voltage change with the controlled rectifier section, as illustrated in the example voltage control strategy of FIG. 4A. The input line power quality can stay within an acceptable range even when only one diode rectifier DR1 is enabled. Indeed, the full range of output voltages for the PSU 100 can be covered by using multiple diode rectifiers DR1, DR2 with fixed steps. This is supplemented by the controlled rectifiers CR1, CR2, CR3 that regulate the DC voltage in between voltage steps. Referring to FIG. 4A, Table 1 illustrates an example sequence enabling the production of the full output voltage.

TABLE 1

| 1 | Start from 0 volts at the load. This is the base value for the buck-boost controlled rectifier. The boost controlled rectifier would have a higher base value exceeding the transformer secondary voltage. |
|---|---|
| 2 | Using the controlled rectifier section, ramp up the voltage to a value at least equal to the voltage of one of the diode rectifiers' steps. |
| 3 | Turn on the first diode rectifier while reducing the controlled rectifier's output to almost zero to keep the total load DC voltage constant. |
| 4 | Keep on increasing the controlled rectifier voltage to a value at least equal to the cumulative voltage of the first and second diode rectifier. |
| 5 | Turn on the second diode rectifier, while reducing the controlled rectifier's output to almost zero to keep the total load voltage constant. |
| 6 | Increase the controlled rectifier's voltage to reach the total voltage needed. |
| 7 | Keep adding steps (of 6, 12, or 18 pulses) as previously described if more diode rectifiers are available. |
| 8 | Reverse the process when the load voltage is reduced. |

Still referring to FIG. 4A, using the diode rectifiers as steps to ramp the load voltage (power) up or down has certain effects on the AC inlet power quality. At very low output voltages, all the diode rectifiers are disabled, and the input current distortion of the PSU 100 depends solely on the low harmonics production of the controlled rectifiers, which is generally very good. When a first 6-pulse diode rectifier is enabled, it produces, in some embodiments, a 30% current distortion relative to the fundamental current at the transformer's primary. This distortion decreases as the controlled rectifier increases its "clean" contribution. At this low output voltage, the load power is generally low with respect to the AC source full power capacity which makes this high percentage of distortion relatively small in absolute terms. As an example, a 20% current distortion relative to the fundamental at a quarter of the power level is equivalent to a 5% Total Harmonic Distortion for current (THD I) at full power, usually meeting power quality regulations. This current distortion can be further reduced by adding harmonic mitigating currents using the controlled rectifier, as described hereinabove. When a higher voltage is needed that exceeds the controlled rectifier capacity, a second 6-pulse diode rectifier is added. In general, the second diode rectifier's AC voltages are shifted by 30 degrees by the transformer's secondary, to obtain a 12-pulse rectifier. This produces, in some embodiments, a 12% current distortion relative to the fundamental current at the transformer's primary. This distortion is further decreased as the controlled rectifier increases its "clean" contribution. At this medium output voltage, the load power is still a fraction of the AC source full power capacity. As an example, a 12% current distortion at two thirds of the power level is equivalent to an 8% THD I at full power. Again, the current distortion can be further reduced by adding harmonic mitigating currents using the controlled rectifier.

In some embodiments, switches S4-S5 on the AC inputs are used to activate or de-activate each of the rectifiers (DR1, DR2), as shown in the example of FIG. 3A. It will be understood that S1, S2, and S3 may be omitted as they are used for safety purposes when a switching array is not in use. The location of the switches S4-S5 on the AC side 212 does not disrupt the DC current flow when open (i.e., disabled), as the DC current can continue flowing through the diodes. This allows the PSU 100 to produce DC current continuously, with minimal disruption when voltage steps are changed.

Figure 3B:
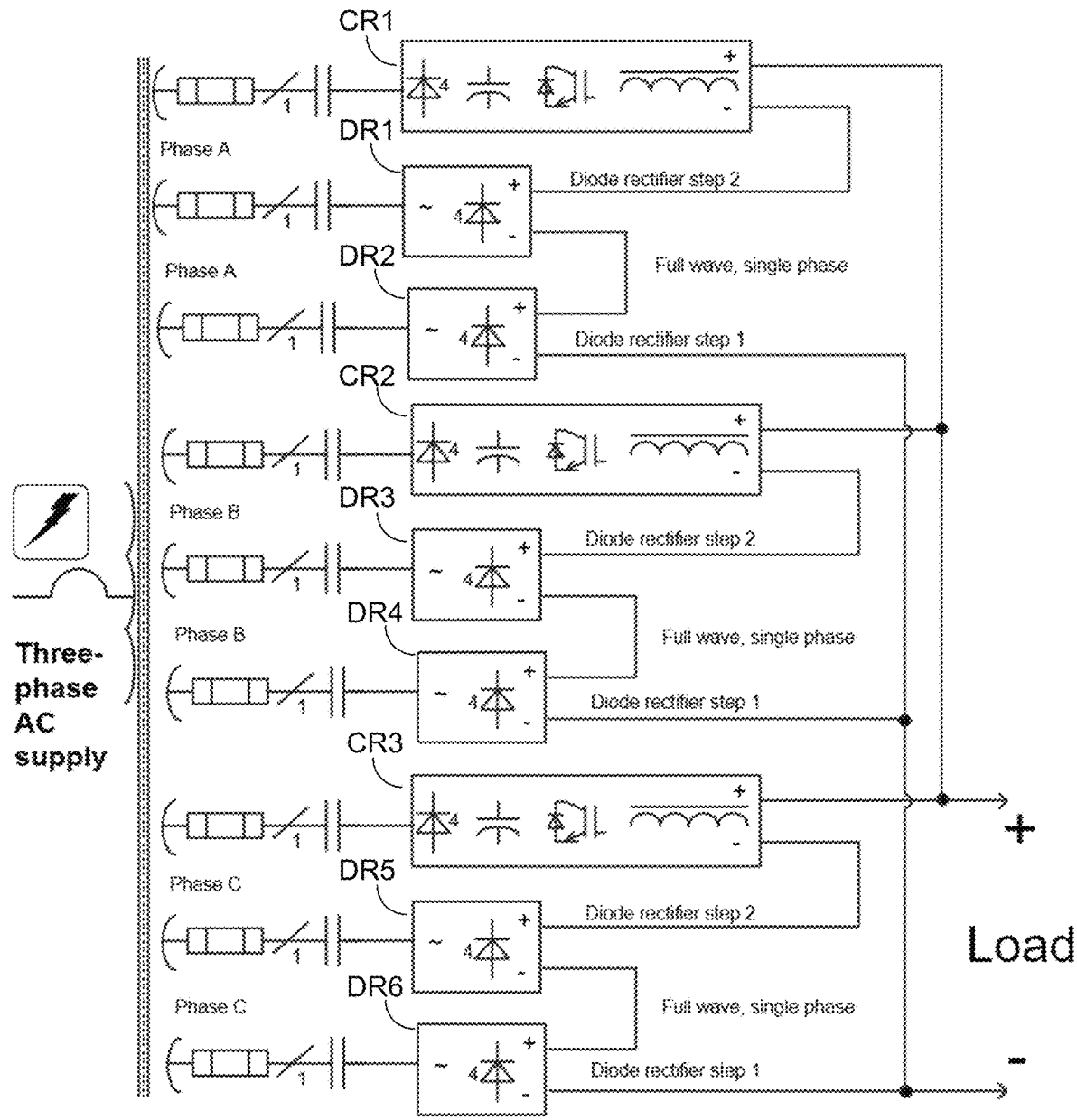
Figure 4B:
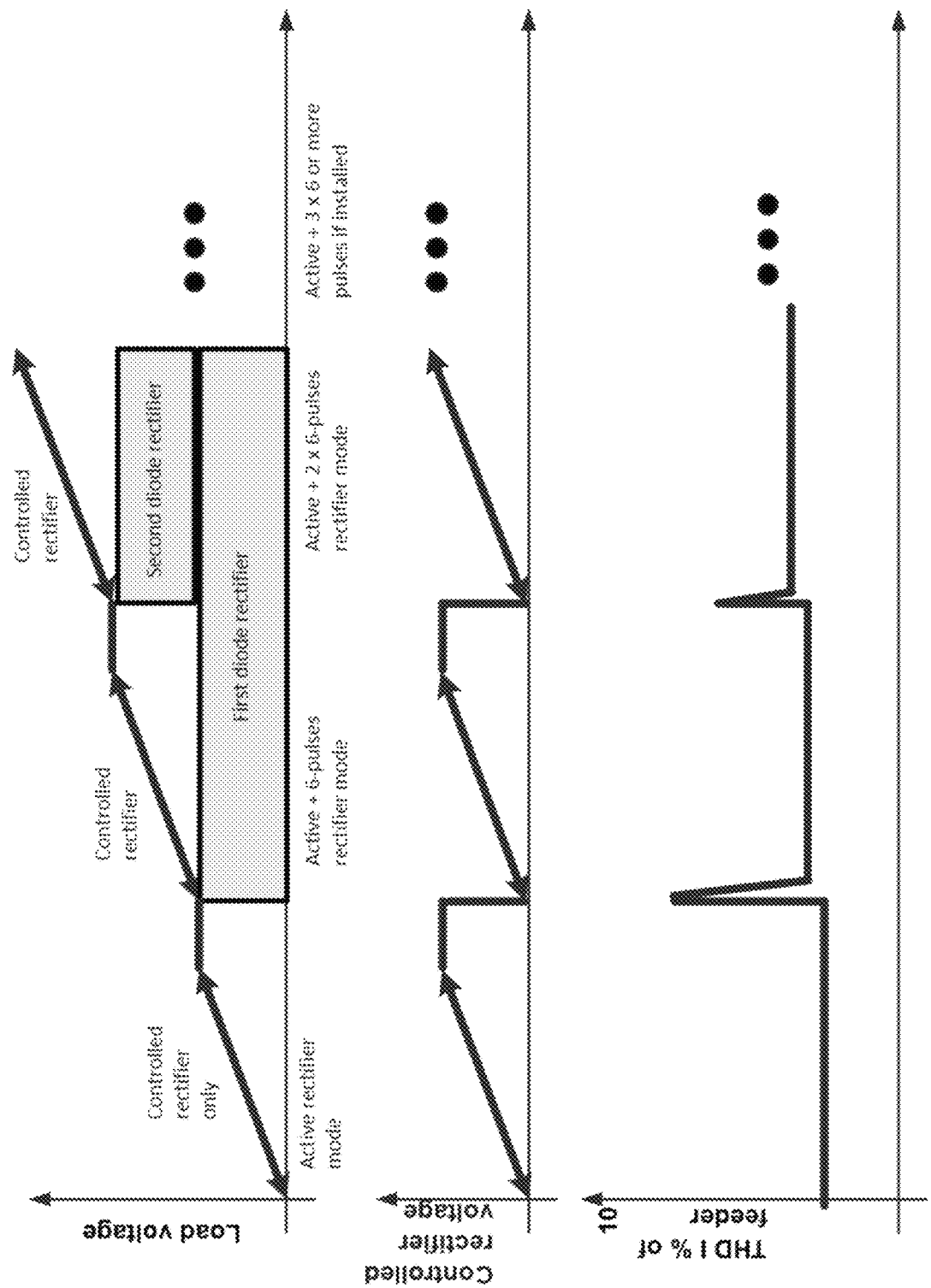

FIG. 3B is another example for a per-phase embodiment of the rectification circuit 200, using single-phase rectifiers for the diode rectifier section 204, as per the embodiment of FIG. 2B. This embodiment performs the same function as that shown in FIG. 3A, but with improved performance regarding the power quality seen at the AC grid. Phase A is rectified using DR1, DR2, CR1, Phase B is rectified using DR3, DR4, CR2, and Phase C is rectified using DR5, DR6, CR3. Rectifying each phase of the transformer secondary independently facilitates the control of the phase current and improves the power quality at the AC side. The step-based control of the diode rectifiers is maintained with lower total harmonic distortion. A voltage control strategy is illustrated in FIG. 4B. Each step activates the corresponding single-phase diode rectifiers located in phases A, B, and C if the DC outputs are connected in parallel. They may be operated independently if we consider each phase as an independent rectifier output to drive three separate loads. It will be understood that more or less diode rectifiers (DR) and/or controlled rectifiers (CR) may be used.

Figure 5A:
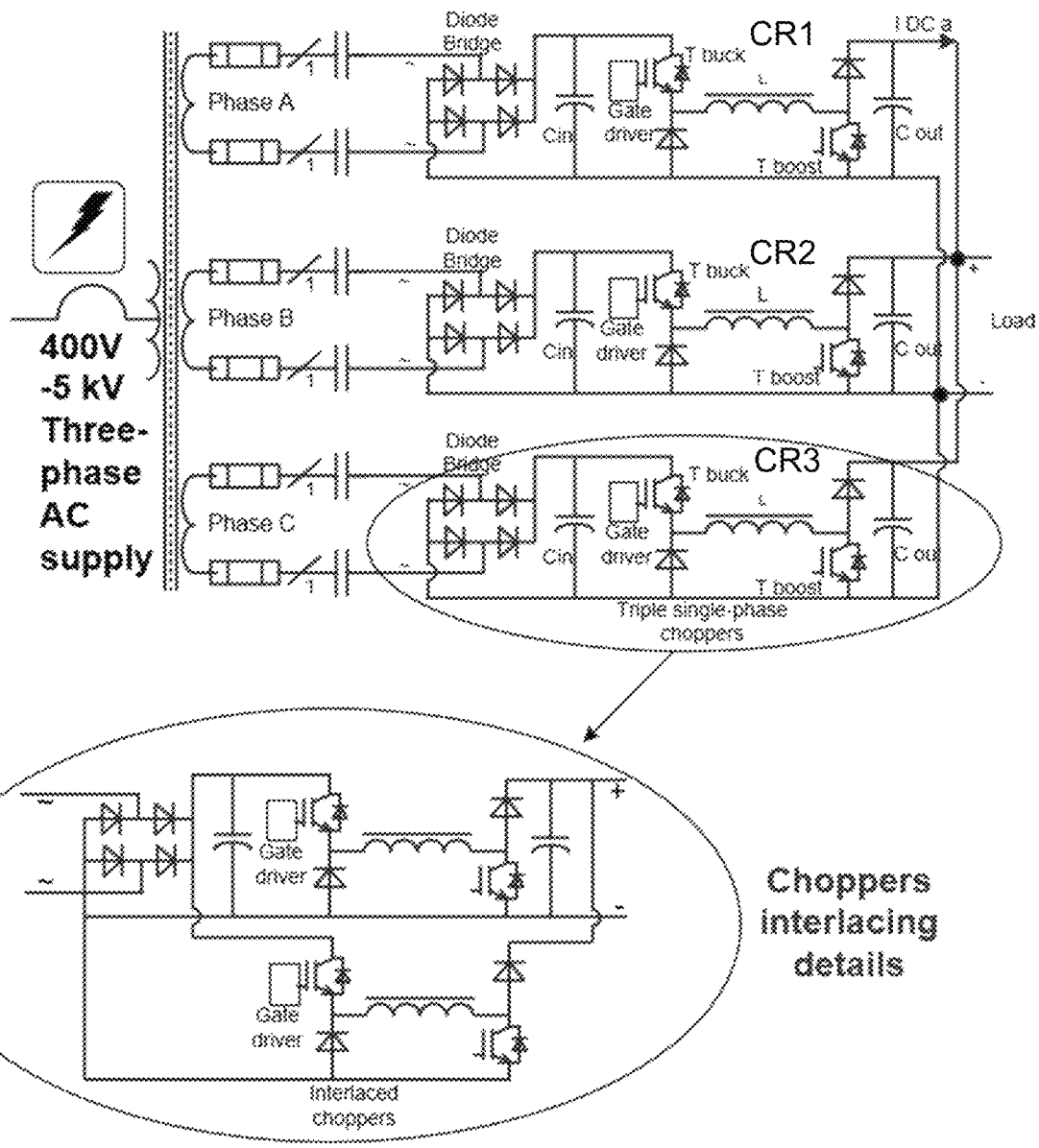
FIG. 5A is a circuit diagram showing an example of multiple interleaved controlled rectifiers.
Figure 5B:
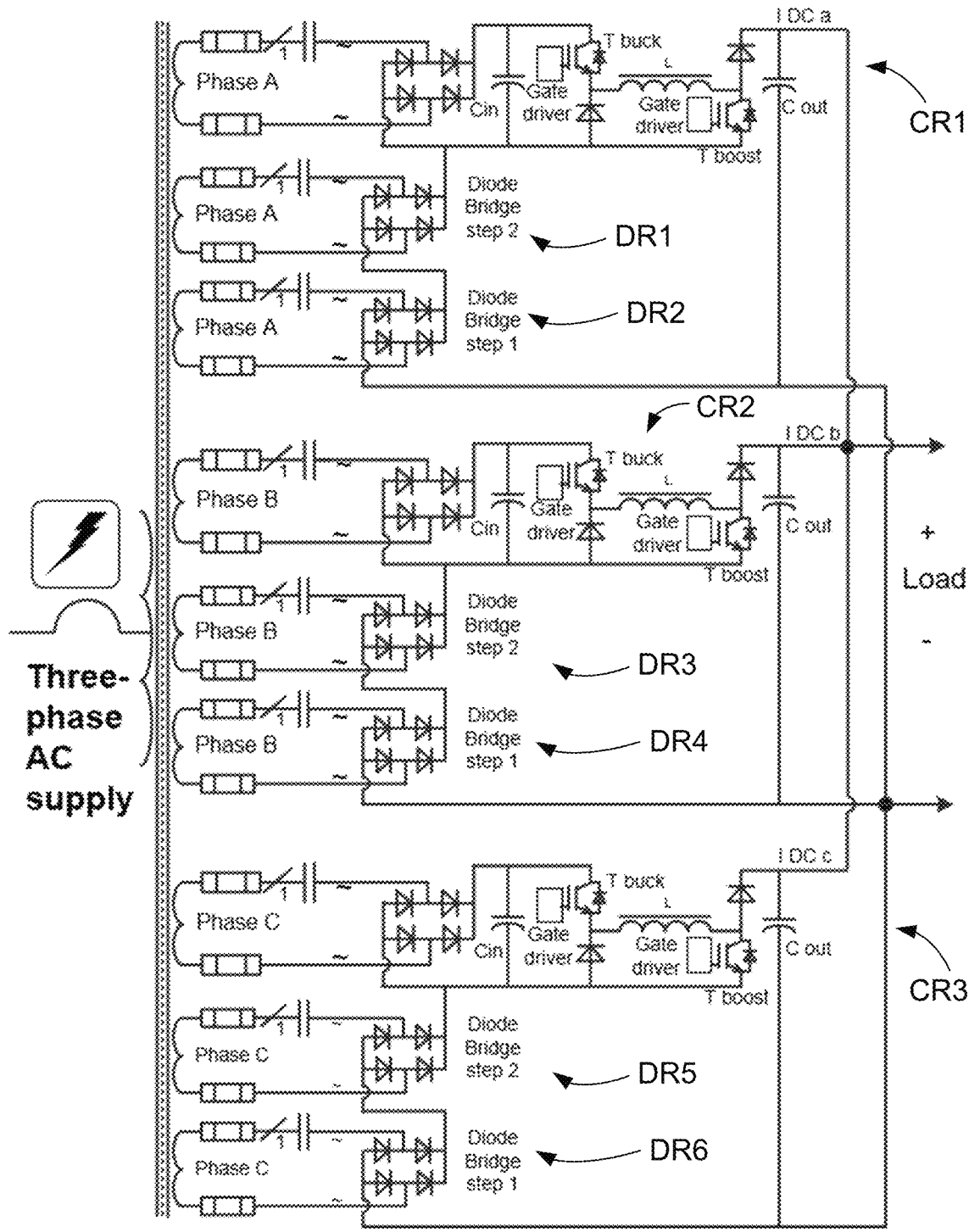
FIG. 5B is a detailed example of diode rectifiers and buck-boost controlled rectifiers for a per phase design.
Figure 5C:
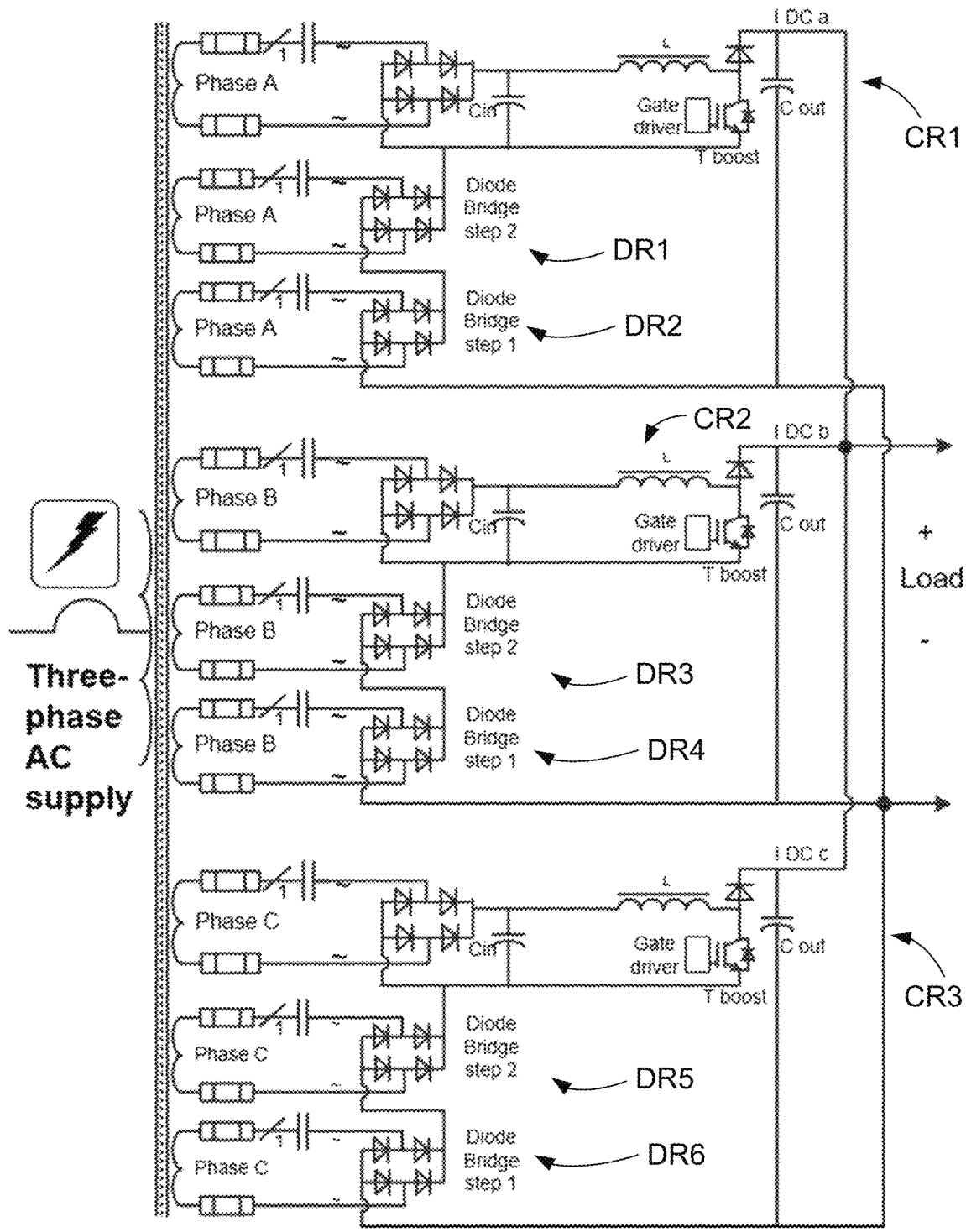
FIG. 5C is a detailed example of diode rectifiers and boost controlled rectifiers for a per phase design.
Figure 5D:
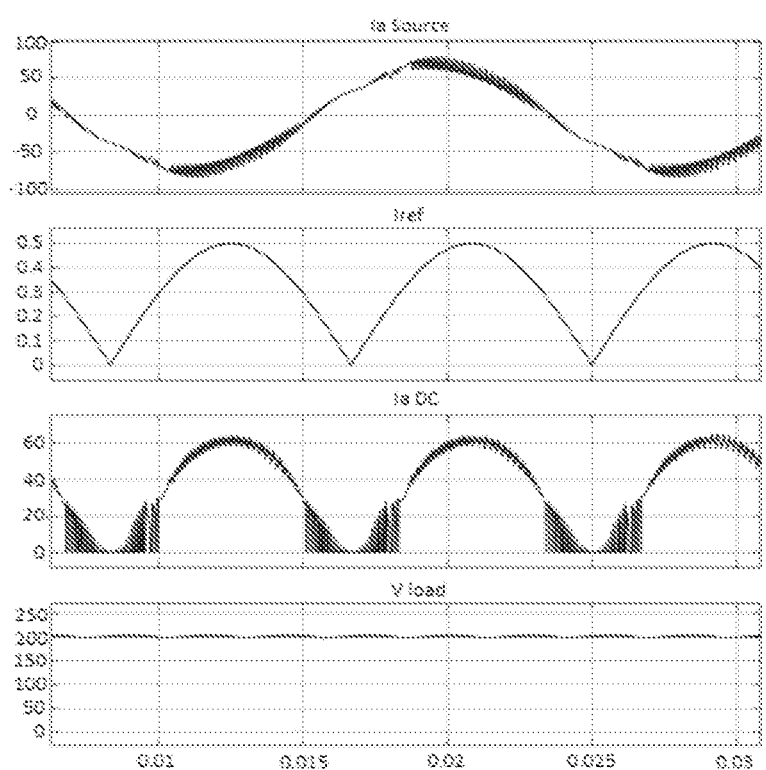
FIG. 5D shows examples of electrical waveforms for the PSU for one of three phases.
Figure 5E:
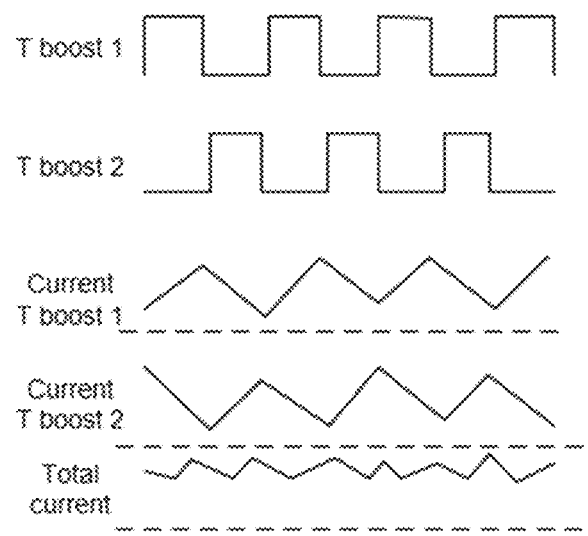
FIG. 5E shows examples of electrical waveforms for multiple interleaved controlled rectifiers.

In some embodiments, the controlled rectifiers CR1, CR2, CR3 are each composed of a single-phase diode bridge followed by a buck-boost transistor converter. Examples are illustrated in FIG. 5A, 5B, where each controlled rectifier module is fed by an isolated phase from the input transformer. FIG. 5B additionally shows single-phase diode bridges in the diode rectifier section feeding into the single-phase controlled rectifier section. In very large applications, paralleled sub-modules can be used to reach the required current. This topology uses simple Pulse Width Modulation (PWM) or other suitable technique in the controlled rectifiers to solve the power factor and harmonics issues. Each single-phase diode rectifier current is imposed by its corresponding controlled rectifier, mitigating its harmonics production as shown in the waveforms of FIG. 5D. The buck-boost converters of the controlled rectifier produce a DC voltage from 0 to approximately 200% of the peak AC voltage. When simpler boost converters are used in the controlled rectifiers as shown in FIG. 5C, they produce a DC voltage from approximately 100% to 200% of the peak AC secondary voltage. Note that the boost switching allows the production of a higher DC voltage level at reduced power. In the embodiment of FIG. 5C, multiple controlled rectifiers can be interleaved in a manner similar to that shown in FIG. 5A. FIG. 5E further illustrates examples of a small section of electrical waveforms for multiple interleaved controlled rectifiers. In the embodiment of FIG. 5E, a dual boost transistor controlled rectifier is used.

In the embodiments illustrated in FIGS. 5A-5B the controlled rectifier uses galvanically isolated transformer secondary windings (phase A, B, C) each feeding a single-phase, four-diode bridge. The DC output of each diode bridge feeds a buck converter sharing its inductor with the boost converter that follows. This produces a controlled DC source with a voltage range from 0 to multiple times the AC voltage at the diode bridge and is achieved while forcing the diode bridge AC current to follow a nearly sinusoidal wave shape with a low harmonic content. Other controlled rectifier topologies using a boost only IGBT are illustrated in FIG. 5C or various other combinations of diodes and IGBT bridges can be used to obtain similar results. These also fall within the possible implementation of this invention. The three single-phase controlled rectifiers can be connected in parallel or in series at the DC side 214 to form a complete three-phase controlled rectifier or can be used independently. This produces a low ripple DC source with a good power quality on the AC side 212 as shown in the waveforms of FIG. 5D. In particular, with the galvanic isolation afforded by the input transformer, the rectifier section comprises a plurality of single-phase rectifiers that can be connected either in parallel to feed a high current output, in series to feed a high voltage output, or used independently to feed separate loads. The configuration can be hardwired or configured through the switching array. It should however be understood that, in some embodiments, one set of three-phase diode rectifiers may be fed from the AC supply without transformer galvanic isolation. This may save on the transformer cost at the expense of non-isolated output.

In some embodiments, multiple buck-boost converter pairs are provided in parallel, as shown in the inset of FIG. 5A. The switching pattern of the buck-boost or the boost converter pairs can be interleaved to decrease the switching ripple. This also increases the current capacity proportionally to the number of converters per phase. Each converter's phase produces a half-wave rectified current output. As is the case for all single-phase loads, this power is pulsating at twice the line frequency. Combining the rectifiers from three phases allows the sum of their outputs to produce a constant current and voltage, and the pulsating power from each phase cancels out. Indeed, a three-phase sinusoidal balanced current is drawn from the transformer 202, producing a constant power Since the DC load voltage is also constant, the DC current must be constant as well. The same scenario applies when boost only controlled rectifiers are used in FIG. 5C.

Figure 6A:
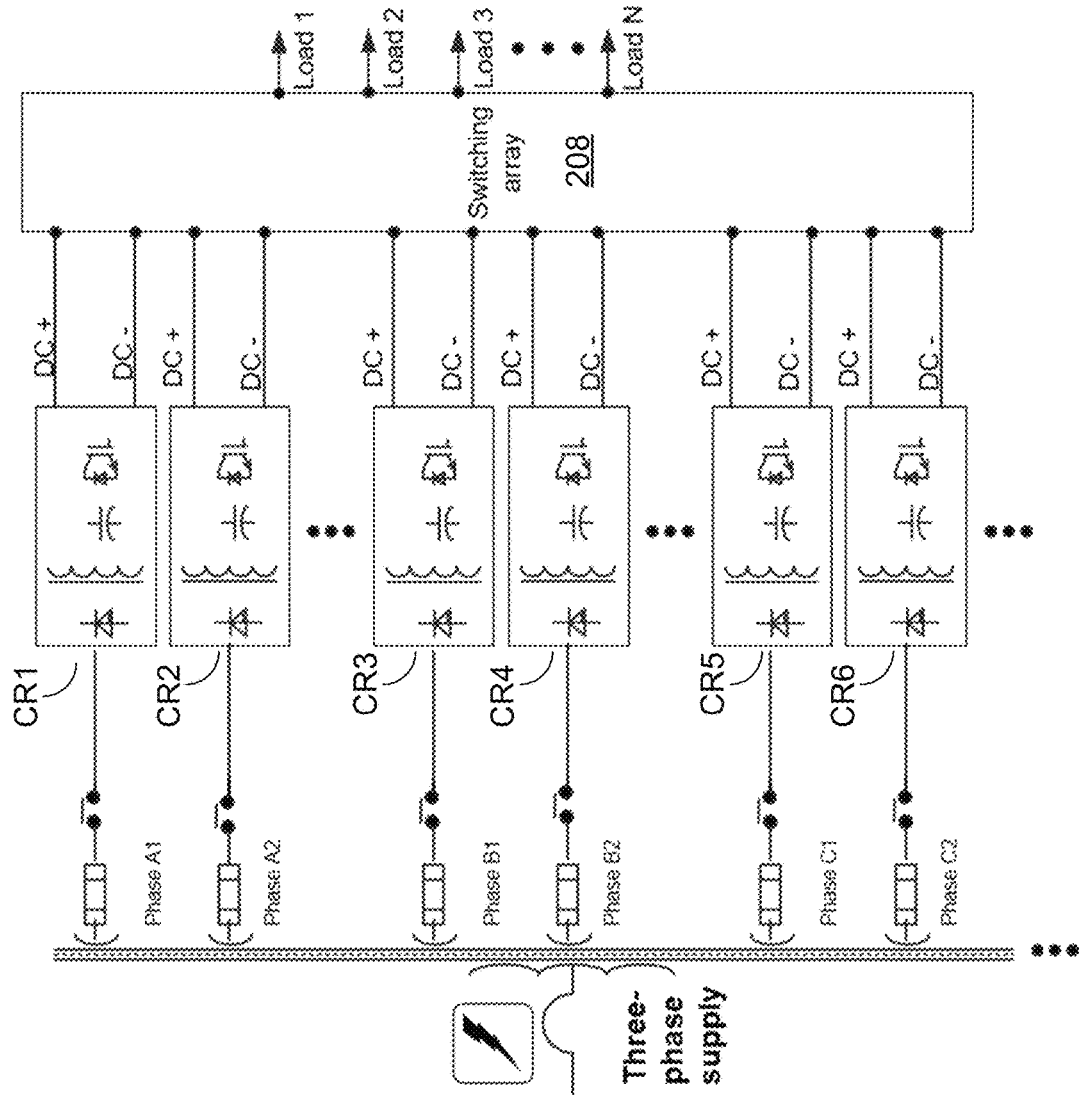
FIG. 6A is a simplified electrical diagram showing an example use of multiple controlled rectifiers with a switching array to service multiple loads.
Figure 6B:
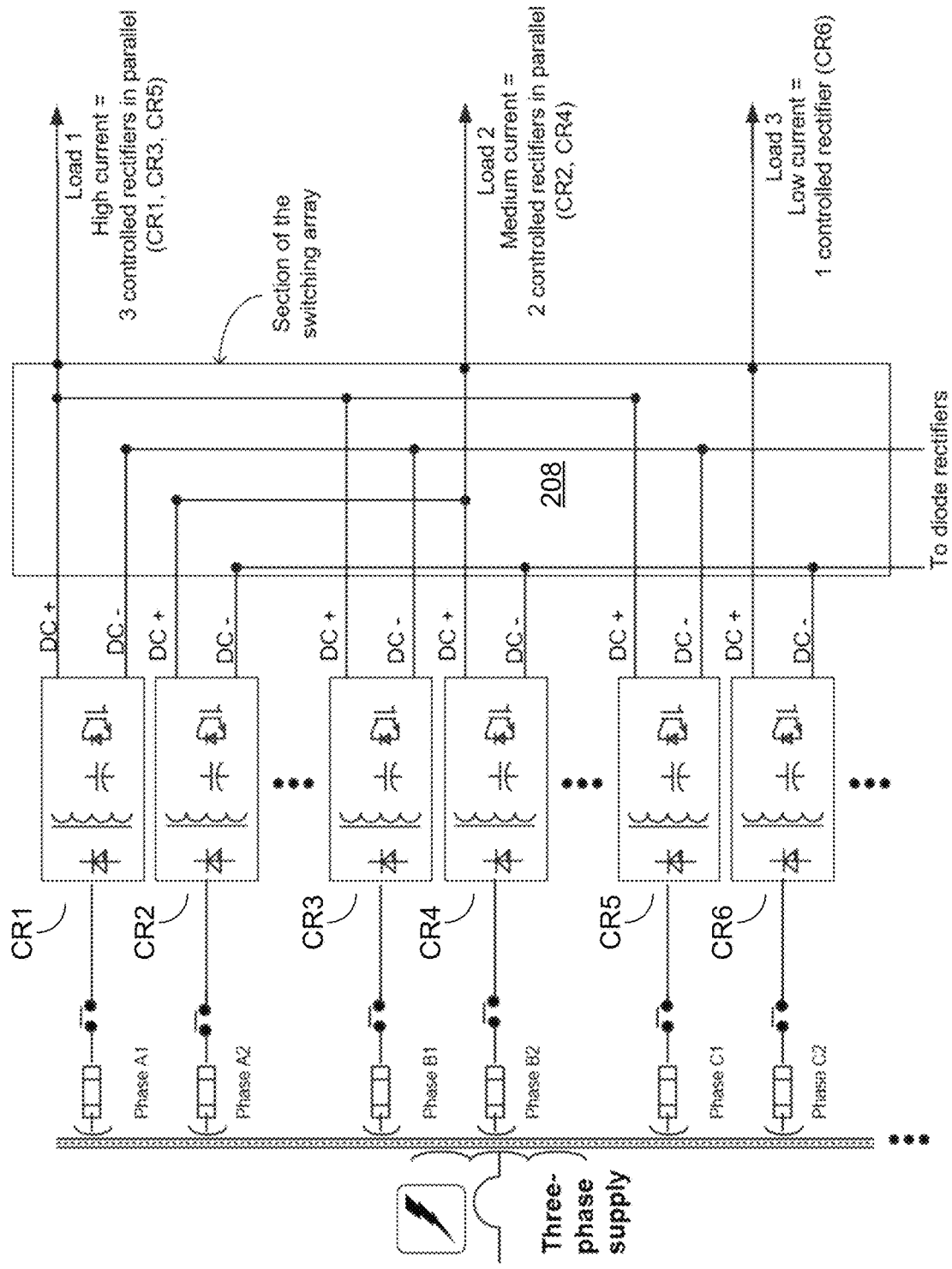
FIG. 6B shows three configurations of controlled rectifiers possible with the switching array.

The boost section of the controlled rectifier shows flexibility. It has the capacity to produce a voltage well above nominal, at a lower current. This is useful when the PSU 100 is used to drive loads akin to an electric plasma torch to process waste, for example, as this type of load requires a high ignition voltage at a very low current. Another low power usage for the boost section of the controlled rectifier is to measure the load impedance when powering it up to avoid powering into a faulty condition. This is useful for different types of loads, as short, low energy pulses can be generated to safely conduct this measurement and access the load condition. FIG. 6A is a simplified electrical diagram showing an example use of multiple controlled rectifiers with a switching array (as in switching array 208) to service multiple loads. FIG. 6B shows three possible configurations of controlled rectifiers that may be used with the switching array as in 208.

The transformer 202 secondary voltages 212 do not need to be equal. Some rectifiers can operate at a lower voltage than the others to enhance the range of operation. An example would be to have one diode rectifier step operating from 120 VAC while the second one operating from 240 VAC. This arrangement could be used to produce a binary like voltage level for the diode rectifier steps, increasing the range of voltage or its resolution.

Electric vehicle battery chargers have intermittent operation, as vehicles are added and removed. This becomes an issue for the grid AC supply as fast chargers operate at much higher power levels than the typical residential chargers. This high power load cycling could hinder the AC grid's stability and makes poor use of the grid's infrastructure. With the addition of auxiliary energy storage equipment, the PSU 100 can be used to mitigate this negative effect and even allows for the installation of a fast charger where the grid does not have enough capacity to meet the vehicles' peak power requirements. An example is shown in FIG. 7 which also illustrates a seamless integration of renewable energy sources and energy storage equipment within the PSU 100.

One of the challenges facing renewable energy infrastructures is the high cost of the components and the difficulty in reaching constant energy production and efficiency in real life applications. A typical example is the need for energy storage associated with wind or solar energy sources to smooth out the production. The storage system represents a large increase in the installed cost, but is only used intermittently during peak periods, making it an expensive accessory. By sharing the energy storage system with the vehicle charger, its usage is increased with very little incremental cost. By combining different technologies in complementary ways, the overall energy efficiency is improved, and costs are reduced. Using the PSU 100 as described herein, functionalities beyond being a DC charger are obtained. The PSU 100 can become a complete electrical energy interface for multiple applications. The specific design of the rectification circuit 200 is uniquely suited for this sharing of resources.

Figure 7:
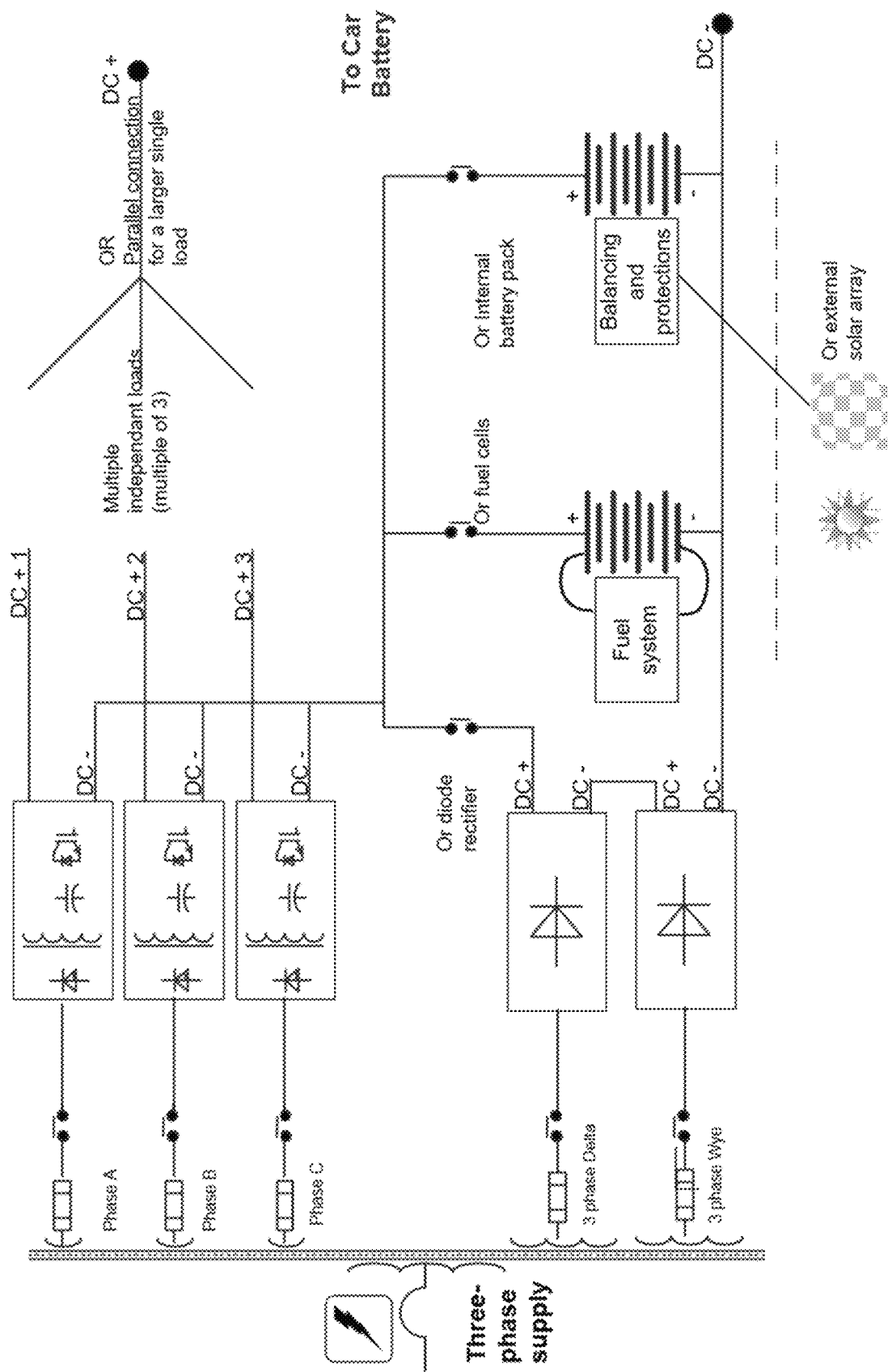
FIG. 7 is a simplified schematic diagram illustrating an example configuration for integration of renewable energy sources and storage within the PSU.

FIG. 7 illustrates the adaptable topology of the PSU 100 that allows a fixed voltage to be supplied by the diode rectifier section or by an intermittent energy source, or a battery pack or other energy accumulators. In this case, the load voltage is still regulated by the controlled rectifiers. This combination provides energy storage for peak power demand reduction when feeding large loads and/or taking advantage of lower electricity rates. This selection of the energy source is implemented dynamically by the switching array of FIG. 9. Its exact topology and the number of switches can be adapted to the needs. Its purpose is to re-direct available rectifiers to different operations. In this example, the energy accumulator may use inertial technology (fly wheel), redox flow battery, hydrogen fuel cell, supercapacitors, etc. Any energy accumulator that produces a relatively stable DC voltage with suitable current capacity can be used. Solar or wind energy sources can be used as well.

Using the switching array (reference 208 in FIG. 2C), the energy accumulator can be recharged by the PSU 100 during off-peak times, such as in-between vehicle charging. This has the effect of keeping the power demand from the AC grid more constant than what it would have been without energy accumulation. Since the PSU 100 uses multiple independent controlled rectifiers, some of them are available when the demand for charging is low, to charge the energy accumulator. This eliminates the cost associated with a three-port DC/DC converter typically used by other electric vehicle chargers using energy accumulators.

Figure 8:
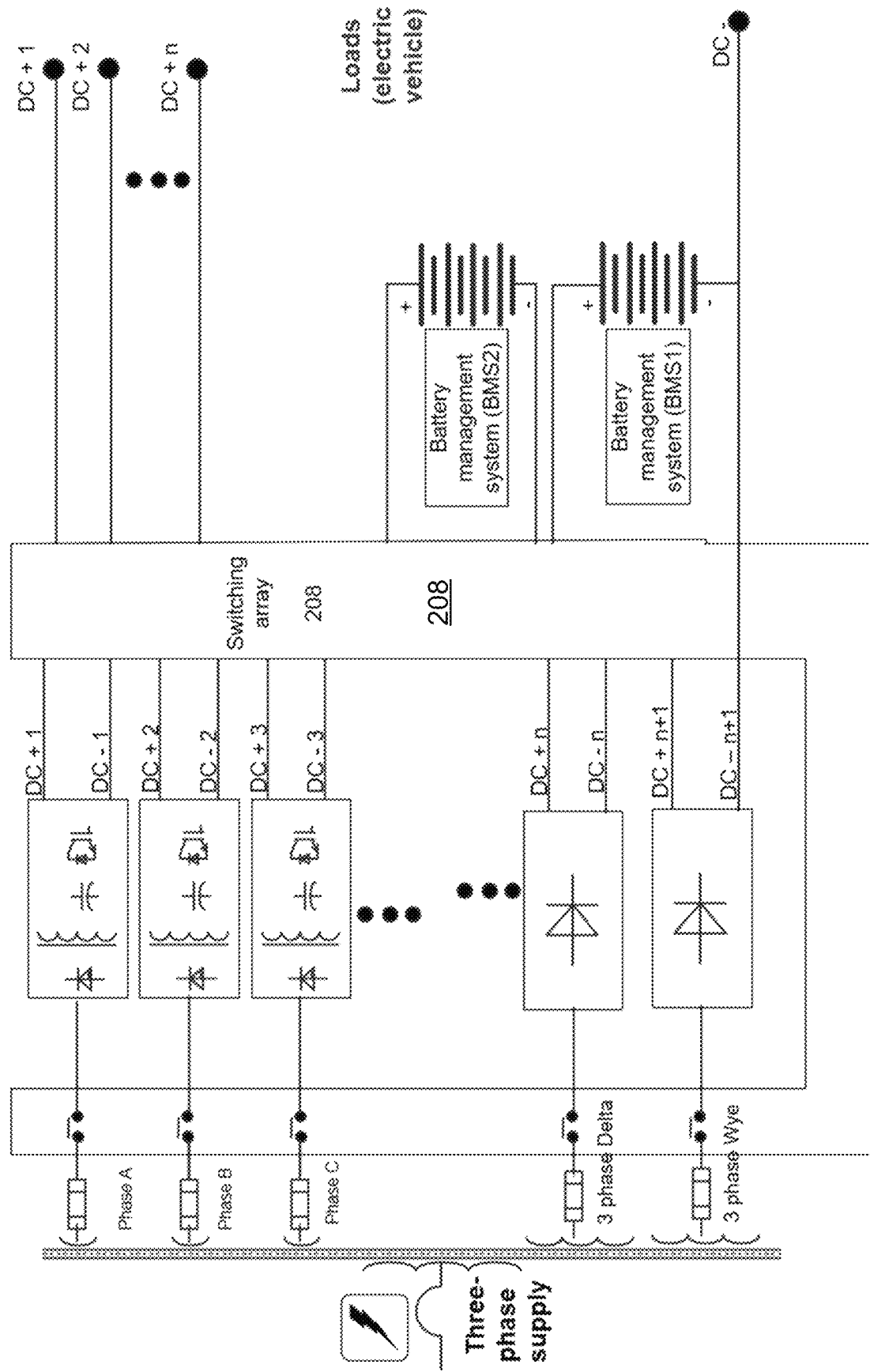
FIG. 8 is a simplified electrical diagram showing an example configuration of the PSU using a split battery pack.

With reference to FIG. 8, in applications where a high voltage battery pack replaces or supports the diode rectifier, this battery pack can be split in two or more sections (i.e. voltage steps) with isolation switches (CB1, CB2) and diodes (DB1, DB2). Each battery section may have its own management system (BMS). They can reproduce the steps of the diode rectifiers described in FIGS. 4A and B. This allows them to be used instead of the diode rectifiers when their energy is needed to charge a vehicle. The controlled rectifier connected in series by the switching array does the load regulation.

Figure 9:
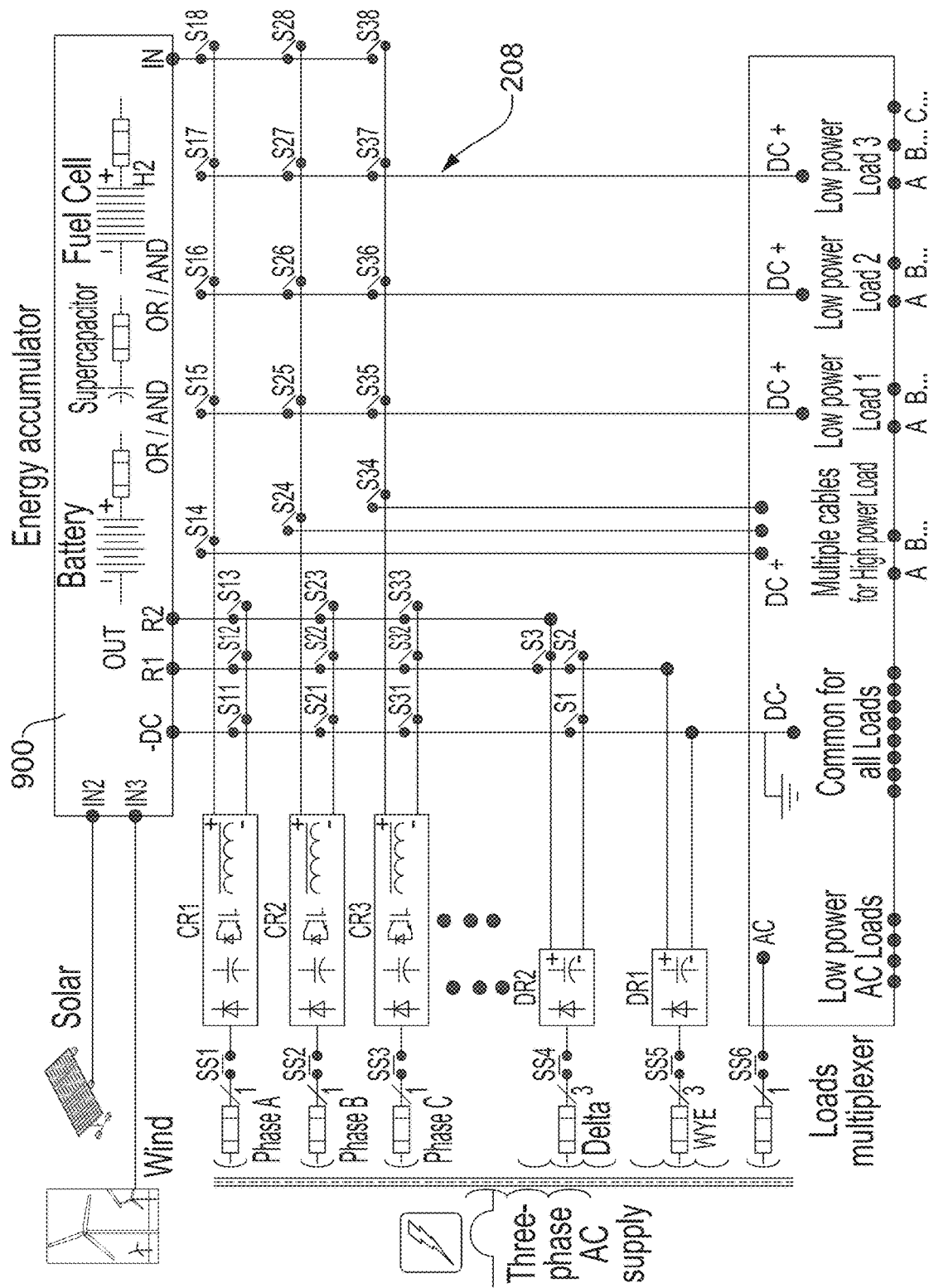
FIG. 9 is a simplified electrical diagram showing an example switching array.

With reference to FIG. 9, the additive modularity of the PSU 100 allows it to reach a very high power using currently available electronic components and permits the independent operation of the modules. Using the switching array 208, multiple independently controlled, fractional power outputs can be configured. This provides the flexibility of supplying a maximum size load when all the controlled rectifiers are inter-connected or many smaller loads when the controlled rectifiers are operated independently. In a battery charger application, this simplifies the management of an electric vehicle fleet where large and small vehicles may need different charging powers. Large vehicles can be charged at high power using all the controlled rectifier sections in parallel. Later, the galvanically isolated and independent controlled rectifiers can charge many smaller vehicles simultaneously. Each vehicle fed by a controlled rectifier can benefit from the energy coming from the grid through a diode rectifier, the energy storage, or the renewable energy source if needed. This ease of source substitution comes from the combination of the different types of rectifiers with very little additional material cost. Depending on the situation, in addition to charging vehicles, the switching array 208 can use an available controlled rectifier to charge the energy storage, either from the grid or from the renewable energy sources. Note that not all combinations may be desirable, but the design of the PSU 100 affords the flexibility of producing low and medium power charging outputs simultaneously. Several AC outputs can also be derived from the transformer to supply smaller vehicles with built-in chargers, which does not require any of the DC rectifier modules. In other words, in some embodiments, the input transformer feeds some AC outputs through the switching array 208. FIG. 9 presents a configuration of switches optimized for parallel connection of the controlled rectifiers in order to achieve high current output(s), but some applications could require very high voltage at the output(s). In this case, a few more switches can be added to the array to place some or all controlled rectifiers in series.

Figure 11:
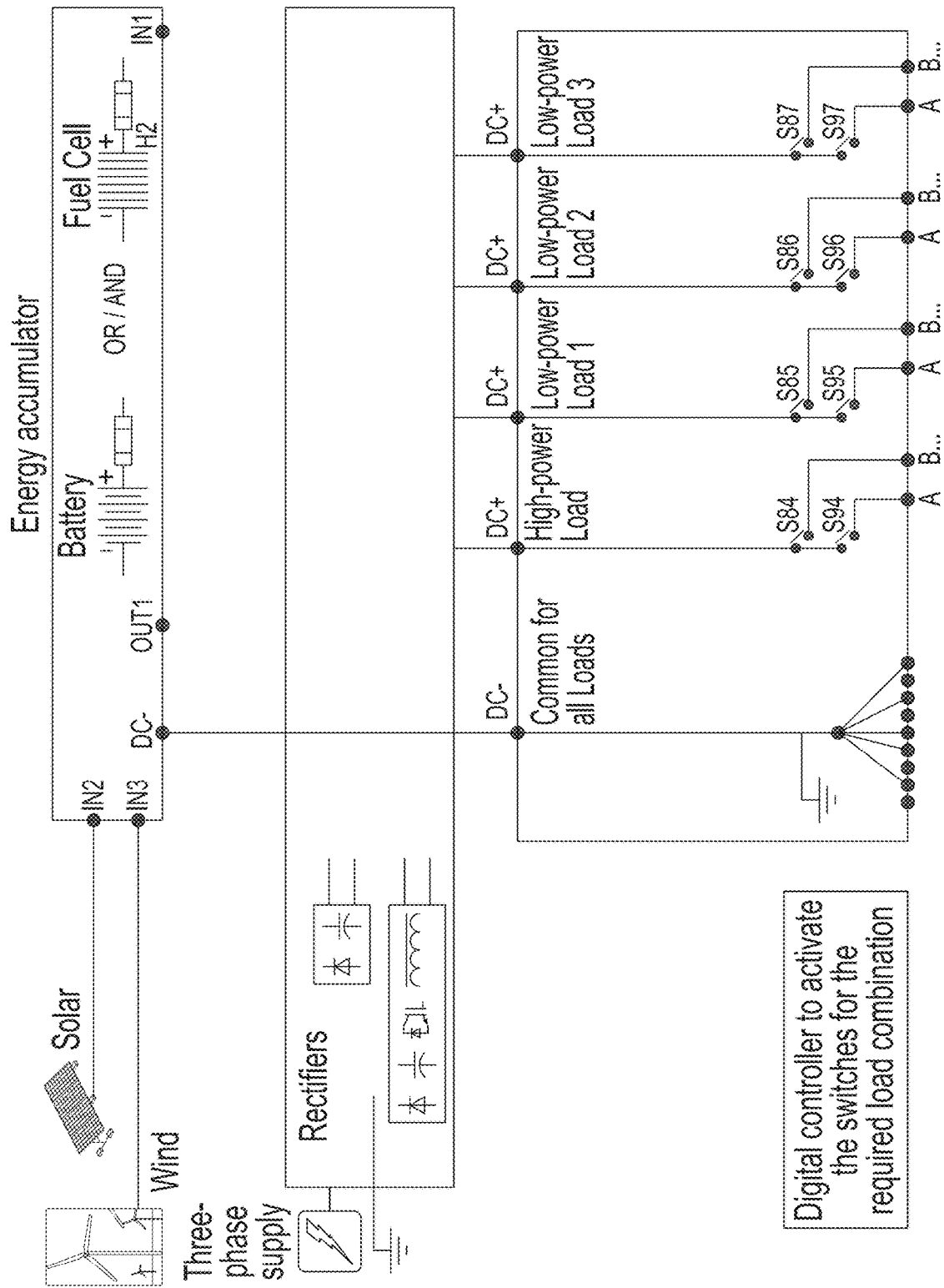
FIG. 11 is a simplified electrical diagram showing an example of a load multiplexing array.

In some embodiments, the multiple regulated output functionality (capacity sharing) is extended to multiplexed charging outputs (time sharing) for electric vehicle applications. Adding supplementary switches to the switching array, each controlled charger output can be automatically multiplexed (i.e. shared one at a time) to many vehicles. In other words, some of the switches of the switching array may be configured to multiplex some of outputs of the controlled rectifiers between multiple vehicles in a programmed sequence. This is useful when charging multiple vehicles overnight or during unsupervised periods. As an example, for a fleet of school buses, several buses can be connected to the charger at the end of the day and charged one at a time overnight, resulting in reduced equipment costs compared to dedicated chargers. Through the controller 210, an order of priority can be given to the connected vehicles. FIG. 11 shows an example for doubling each charger output, but more switches could be used to produce more outputs. It is to be noted that the number of multiplexing switches can vary for each output if the operator wishes to segregate groups of charging cables for light or heavy-duty vehicles. Switch S84 of FIG. 11 can be activated by the controller 210 to charge a first vehicle while switch S94 of FIG. 11 is deactivated. Once the first vehicle is charged, switch S94 can be activated while switch S84 is deactivated to charge the second vehicle. A similar sequence can happen simultaneously on the other outputs.

Figure 10:
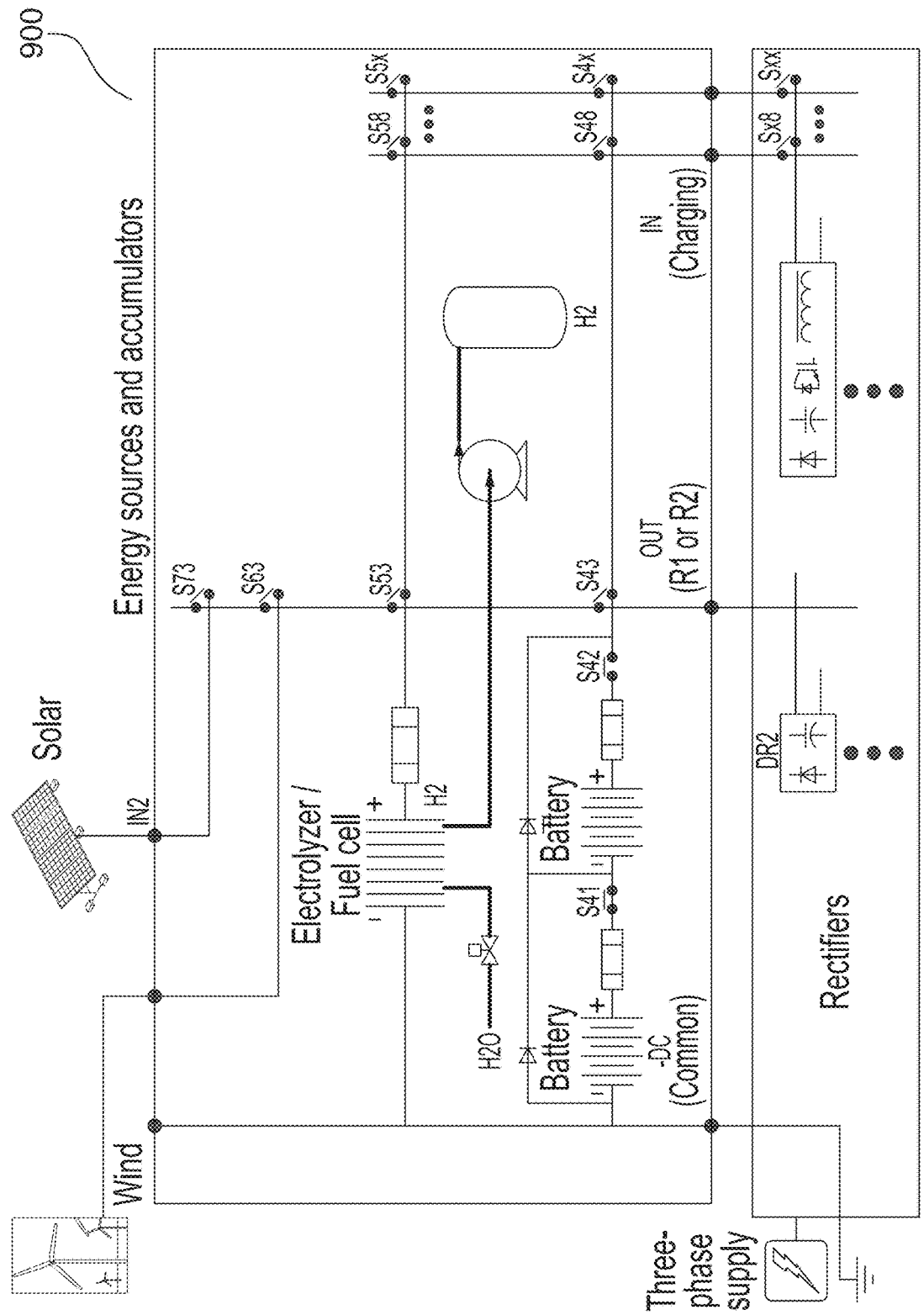
FIG. 10 is a simplified electrical diagram showing an example of energy sources and storage configured by the switching array.

In some embodiments, load variation seen by the grid can be reduced by using the PSU 100 to store energy in a battery pack or to drive an electrolyzer (fuel cell) to produce green hydrogen in between electric vehicle charges or to drive intermittent loads, such as an electric plasma torch waste disposal system. Referring to FIG. 10, the PSU 100 can therefore serve both electric and hydrogen vehicles, which provides added flexibility. The cost of the green hydrogen production equipment is also reduced as it shares the rectifiers, the energy storage, and the renewable energy sources of the PSU 100 as well as its connection to the grid. The electrical equipment typically represents up to 50% of a hydrogen production system. The hydrogen produced during low electrical demand periods can be compressed in situ and used as a hydrogen fueling station for vehicles or stored to be distributed as needed. Using the switching array 208, it is possible to use part of the PSU 100 capacity to produce hydrogen while simultaneously having some electric vehicle charging outputs available. The hydrogen production system may be a bi-directional fuel cell to produce electricity to charge an electric vehicle during peak times, which can replace and/or supplement the battery storage. Other synergies are also possible when combining hydrogen production and electric storage in one system. The thermal efficiency of the process can be improved by integrating the PSU 100 cooling system and the green hydrogen gas compression/expansion system. The cooling system can be used to help evacuate the heat produced by the hydrogen compression with minimal supplementary cost.

One challenge with fast charging of heavy-duty electric vehicles is that the charging cables become impractically large and heavy to handle due to the high current required. Presently the largest, water-cooled cables are rated for 400 A, which can handle 320 kW at 800 VDC or 160 kW at 400 VDC. In some embodiments, many cables may be used with the PSU 100. For example, one cable per controlled rectifier (or group of) may be used. Each cable implements the full charging functionalities and protections for multiple small vehicles but can work together to carry the high power for one heavy-duty vehicle. This independent current control capability ensures that the total load is shared between the cables, avoiding an overload. If one of the cables is deemed damaged or limited, its current can be reduced accordingly or it can be isolated independently while the other cables keep charging the vehicle, albeit at a lower rate. The same cables can thus be used to charge small vehicles or work together to charge a large one.

With continued reference to FIG. 9 and additional reference to FIG. 10, the switching array 208 is explained in more detail. The switching array 208 may be a matrix of switches, inter-connecting the different sections of the PSU 100 (rectifiers, storage, renewable energy sources, etc.), that can be used to provide multiple outputs using different voltages and current levels. This is made possible by the electrically isolated rectifier sections. In some embodiments, a partial array of switches is used to obtain only desired combinations. The controller 210, which controls the charging process, is used to select the appropriate rectifier combination, and activate the electro-mechanical switches or semiconductor switches that compose the switching array 208. As such, multiple loads can be operated and controlled simultaneously, and loads can be independently operated at different voltages and power levels. A mix of AC and DC loads can be accommodated on the same PSU 100. Energy storage and alternative sources can be used to provide additional power for the frequent load variations to maintain a constant and continuous power consumption from the AC line. Many charging cables can be combined on the same load or used for independent loads, and cables may be electrically isolated by opening the switches when not in use, to improve safety.

A specific and non-limiting example is shown in FIG. 9, where the diode rectifiers DR1, DR2, etc., and the controlled rectifiers CR1, CR2, CR3, etc. act as a base for the PSU 100. Although five rectifiers are illustrated, more or less may be used. Note that the rectifiers are electrically isolated from each other until the switches are activated. The horizontal lines distribute the electricity to the different functions connected to the vertical lines. Activating a switch at a cross point connects the function to the specific rectifier. Some functions may be hardwired to save on switches, such as the DR1 negative terminal to the charger negative DC output. To feed a single high power DC output, starting with all other switches open, the controller 210 may activate switch S2 to connect DR1 and DR2 in series to obtain a high base voltage. Also, switches S13, S23, S33 may add the parallel combination of CR1, CR2, CR3 to the circuit for high current. Then switches S14, S24, S34 may be activated to conduct the combined currents to the high power load using dedicated cables or they could be combined in a single one. To charge three small vehicles simultaneously at low voltage, the controller 210 would likely assign only one controlled rectifier to each load. With all the other switches deactivated, switch S1 would be activated to use DR1 and DR2 independently for a lower base voltage, reducing the harmonics by using 12 pulse rectification. The first two small loads could use DR1 positive terminals feeding CR1 and CR2 through switches S12 and S22. The third load could use DR2 positive terminals feeding CR33 through switches. Then, switches S15, S26, S37 could be activated to direct current to the low power loads Load1, Load2, Load3. Note that other redundant switching combinations are also possible, such as S35, S26, S17 or S17, S25, S36 and so on. In some applications with less functionalities, the redundant switches would be eliminated and some circuits hardwired.

The energy storage or the renewable sources section 900 connected to the switching array is expanded in FIG. 10 to show the added flexibility of operation by allowing different sources to contribute to the vehicle charging process. Similarly, the internal storage can store energy from the renewable sources when available or from the AC grid when advantageous, all of this without supplementary DC-DC converters as required by other designs. To use the energy storage or the renewable DC sources as the base source for the charger, the controller 210 may de-activate S1, S2 and S3 (FIG. 9) to isolate the diode rectifiers DR1 and DR2, and then activate S41, S42, S43 (FIG. 10) as needed to use the battery pack or S53 for the fuel cell or S63 for a DC wind generator or S73 for the DC solar array. Different combinations of energy storage can be used such as flywheel, super capacitors, or any other suitable form of electricity storage. When surplus renewable energy is available, it can be stored in the battery pack or be used to produce green hydrogen by closing a subset of S41, S42, S53, S63, S73 while using their internal regulators or using one of the controlled rectifiers through the switching array. When AC power is available at low cost, it can be stored in the battery pack or used to produce hydrogen by using an available controlled rectifier and diode rectifier as needed. S48 or S58 or many other similarly arranged switches may be closed to direct the energy to the storage device, thus using the otherwise idle rectifiers as charging regulators. By combining the multiple galvanically isolated rectifier sections with the switching array flexibility of functionality and operation is gained.

The PSU 100 may, in some embodiments, include enhanced protections particularly suitable for high power applications to reduce the risk and consequences of an accident or component failure. For example, when a charging cable is not in use, the switching array may default to open switches, so that no voltage is present at the output terminals. Once operation is commanded, very low energy pulses may be sent by the controlled rectifier, allowing the load impedance to be verified by the controller 210 before enabling the power. In another example, an input transformer with high leakage inductance (low coupling coefficient) between the multiple secondaries and the primary can be used to limit the short circuit current available, which reduces the arc flash energy available at each output and within the PSU 100.

The efficiency of the system is also enhanced by the specifics of the design. In some embodiments of the PSU 100, only one transformer is used to supply the multiple rectifiers. This is particularly suitable when operating at high power almost continually. In other embodiments, separate transformers 202 with primary switches are used with different numbers of secondaries to feed subsets of rectifiers. This may be advantageous to reduce the transformer core losses by activating only the transformer(s) needed to meet the load(s) power requirements.

In some embodiments, the control strategy is split into different local controllers. Some local controllers produce a Pulse Width Modulation (PWM) or similar pattern for the controlled rectifiers while the main controller supervises the operation of the charger and activates the switches in the switching array. It is understood that some of these control schemes can be implemented digitally in a combination of both hardware and software. In other embodiments, some controllers or some functions of the controllers are implemented using analog electronics. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, or a combination thereof. For safety reasons, in most embodiments, the communication links between the sections operating at voltages higher than fifty volts use a galvanic isolation barrier.

Figure 12:
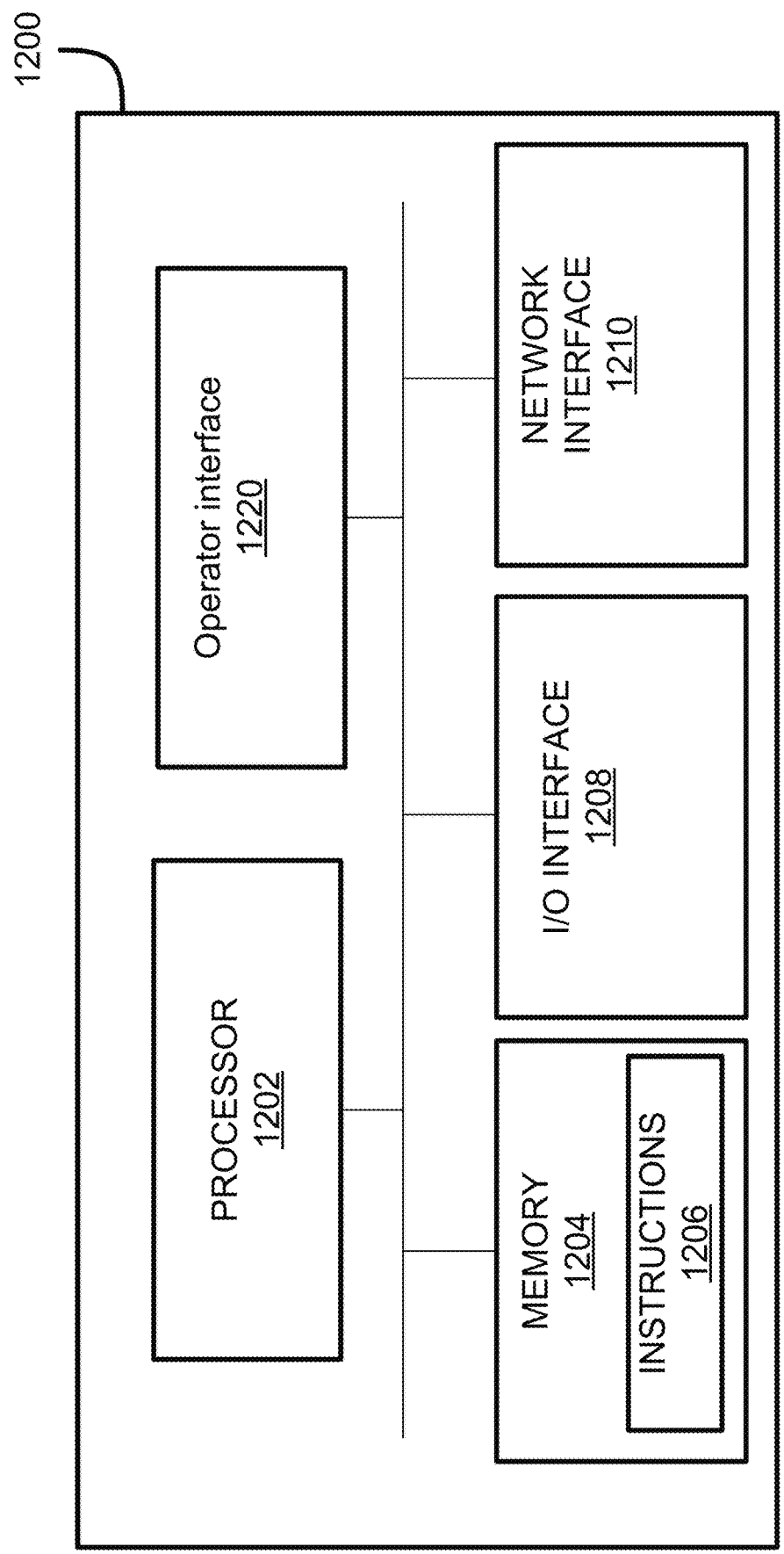
FIG. 12 is an example of a computing device.

FIG. 12 is a schematic diagram of a computing device 1200, exemplary of a controller such as the controller 210. As depicted, computing device 1200 includes at least one processor 1202, a memory 1204 having program instructions 1206 stored thereon, at least one I/O interface 1208, and at least one network interface 1210. The computing device 1200 may also include an operator interface 1220 composed of a screen and input devices such as keyboard or touch pad. Each processor 1202 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Program instructions 1206 are applied to input data to perform the functions described herein and to generate output information. The output information is applied to one or more output devices.

Each I/O interface 1208 enables computing device 1200 to interconnect with one or more input devices or with one or more output devices. Each network interface 1210 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

On some local controllers, the I/O interface 1208 includes multiple PWM outputs and current/voltage sensing inputs to control the transistors of the controlled rectifier 206. Suitable digital outputs are also included to activate the individual switches and contactors used in the switching array 208.

For simplicity only one computing device 1200 is shown, but the system may include more computing devices 1200 operable by users to access remote network resources and exchange data. The computing devices 1200 may be the same or different types of devices. The computing device components may be connected in various ways including directly coupled, indirectly coupled via a network, and distributed over a wide geographic area and connected via a network (which may be referred to as "cloud computing"). The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims.

An example of alternative implementation would replace part or all of the inlet transformer and controlled rectifiers with galvanically isolated single-phase AC to DC converters. In other words, the low frequency input transformer and the controlled rectifiers may be replaced with multiple high frequency, galvanically isolated AC to DC converters. Their DC outputs could be connected in series with diode rectifiers in the same manner as the embodiment presented herein. The AC to DC converters could use high frequency to transfer power through the small isolation transformers. They could be controlled to impose a low distortion current waveform on the diodes and be dynamically configured by the switching array to perform the tasks described herein.

Moreover, the scope of the present application is not intended to be limited to the particular embodiments described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A power supply unit having at least one alternating current (AC) input and at least one direct current (DC) output for producing an output voltage, the power supply unit comprising:
   at least one input transformer coupled to the at least one AC input; and
   at least one rectification circuit defining an AC side and a DC side, and coupled to the at least one input transformer on the AC side, the at least one rectification circuit comprising:
      a diode rectifier section coupled to the at least one input transformer on the AC side, the diode rectifier section comprising at least one set of single-phase diode rectifiers per phase and configured for providing a base voltage from the at least one set of single-phase diode rectifiers; and
      a controlled rectifier section connected in series with the diode rectifier section on the DC side and coupled to the at least one input transformer on the AC side, the controlled rectifier section being configured for producing a variable load voltage to modulate the output voltage between the base voltage and a maximum value of the output voltage, the controlled rectifier section comprising at least one set of single-phase controlled rectifiers per phase, wherein each of the single-phase controlled rectifiers comprises at least a boost converter and, for each phase, the at least one set of single-phase diode rectifiers is connected in series with the at least one set of single-phase controlled rectifiers for independently rectifying each phase of the at least one input transformer, and the at least one set of single-phase controlled rectifiers is configured to impose a DC current waveform onto the at least one set of single-phase diode rectifiers for reducing harmonics produced by the at least one set of single-phase diode rectifiers.

2. The power supply unit of claim 1, further comprising a switching array coupled to the diode rectifier section and the controlled rectifier section, and configured for selectively providing the output voltage to loads connected at the at least one DC output.

3. The power supply unit of claim 2, wherein the switching array is further configured for switching in other DC sources to replace or supplement the diode rectifier section.

4. The power supply unit of claim 1, further comprising a switching array coupled to the diode rectifier section and the controlled rectifier section, and configured for selecting an AC source for at least some of the diode rectifiers and the controlled rectifiers.

5. The power supply unit of claim 1, wherein the at least one set of diode rectifiers is provided for each galvanically isolated secondary winding of the at least one input transformer.

6. The power supply unit of claim 1, wherein the at least one set of diode rectifiers comprises three single-phase diode rectifiers.

7. The power supply unit of claim 1, wherein the at least one set of diode rectifiers comprises a plurality of sets, each one of the sets providing a fixed voltage step of the base voltage.

8. The power supply unit of claim 1, further comprising a plurality of switches connected between the at least one input transformer and the diode rectifier section for selectively activating and deactivating individual ones of the sets of diode rectifiers.

9. The power supply unit of claim 1, wherein each of the single-phase controlled rectifiers comprises a buck-boost converter, the buck-boost converter being a combination of the boost converter and a buck converter.

10. The power supply unit of claim 9, wherein the single-phase controlled rectifiers comprise a four-diode bridge having an output that feeds the buck converter, and wherein the buck converter shares an inductor with the boost converter.

11. The power supply unit of claim 9, wherein the single-phase controlled rectifiers comprise interleaved buck-boost converters connected in parallel.

12. The power supply unit of claim 1, wherein the single-phase controlled rectifiers comprise a four-diode bridge having an output that feeds the boost converter.

13. The power supply unit of claim 1, wherein the single-phase controlled rectifiers comprise interleaved boost converters connected in parallel.

14. The power supply unit of claim 3, wherein the switching array comprises a plurality of switches connected between the diode rectifier section and the controlled rectifier section and the DC sources and loads for dynamically forming sub-groups of rectifiers.

15. The power supply unit of claim 2, wherein the switching array is configured for switching in one of a DC source and a storage device to replace or supplement some or all of the diode rectifiers.

16. The power supply unit of claim 1, wherein some or all of the diode rectifiers and the controlled rectifiers supply current to one of an energy storage device, an electrolyzer, and one or more internal loads.

17. The power supply unit of claim 1, wherein the diode rectifier section further comprises at least one three-phase diode rectifier.

18. A power supply unit having at least one alternating current (AC) input and at least one direct current (DC) output for producing an output voltage, the power supply unit comprising:
at least one input transformer coupled to the at least one AC input; and
at least one rectification circuit defining an AC side and a DC side, and coupled to the at least one input transformer on the AC side, the at least one rectification circuit comprising:
a diode rectifier section coupled to the at least one input transformer on the AC side, the diode rectifier section comprising at least one set of single-phase diode rectifiers per phase and configured for providing a base voltage from the at least one set of single-phase diode rectifiers; and
a controlled rectifier section connected in series with the diode rectifier section on the DC side and coupled to the at least one input transformer on the AC side, the controlled rectifier section being configured for producing a variable load voltage to modulate the output voltage between the base voltage and a maximum value of the output voltage, the controlled rectifier section comprising at least one set of single-phase controlled rectifiers per phase, wherein each of the single-phase controlled rectifiers comprises at least a buck converter and, for each phase, the at least one set of single-phase diode rectifiers is connected in series with the at least one set of single-phase controlled rectifiers for independently rectifying each phase of the at least one input transformer, and the at least one set of single-phase controlled rectifiers is configured to impose a DC current waveform onto the at least one set of single-phase diode rectifiers for reducing harmonics produced by the at least one set of single-phase diode rectifiers.

* * * * *